(12) United States Patent
Suzuki et al.

(10) Patent No.: US 8,374,079 B2
(45) Date of Patent: Feb. 12, 2013

(54) PROXY SERVER, COMMUNICATION SYSTEM, COMMUNICATION METHOD AND PROGRAM

(75) Inventors: Motohiro Suzuki, Tokyo (JP); Hiroshi Kazami, Tokyo (JP)

(73) Assignee: NEC Corporation, Tokyo (JP)

( * ) Notice: Subject to any disclaimer, the term of this patent is extended or adjusted under 35 U.S.C. 154(b) by 455 days.

(21) Appl. No.: 12/443,360

(22) PCT Filed: Oct. 19, 2007

(86) PCT No.: PCT/JP2007/070481
§ 371 (c)(1),
(2), (4) Date: Mar. 27, 2009

(87) PCT Pub. No.: WO2008/047920
PCT Pub. Date: Apr. 24, 2008

(65) Prior Publication Data
US 2010/0074100 A1    Mar. 25, 2010

(30) Foreign Application Priority Data

Oct. 20, 2006 (JP) .................................. 2006-286189

(51) Int. Cl.
*G06F 11/00* (2006.01)
(52) U.S. Cl. ........................... 370/221; 714/4.11
(58) Field of Classification Search .................... None
See application file for complete search history.

(56) References Cited

U.S. PATENT DOCUMENTS

| | | | |
|---|---|---|---|
| 6,446,127 B1 * | 9/2002 | Schuster et al. | 709/227 |
| 6,992,974 B1 * | 1/2006 | Tripathi | 370/216 |
| 7,506,369 B2 * | 3/2009 | Buch et al. | 726/12 |
| 2003/0167343 A1 * | 9/2003 | Furuno | 709/244 |
| 2003/0196052 A1 * | 10/2003 | Bolik et al. | 711/162 |
| 2004/0240652 A1 * | 12/2004 | Kanada | 379/201.1 |
| 2004/0243712 A1 * | 12/2004 | Sakai et al. | 709/227 |
| 2006/0072469 A1 * | 4/2006 | Tazaki | 370/242 |
| 2006/0149812 A1 * | 7/2006 | Lin et al. | 709/203 |
| 2007/0041327 A1 * | 2/2007 | Foster et al. | 370/242 |
| 2007/0047571 A1 * | 3/2007 | Kandikonda et al. | 370/449 |
| 2007/0157016 A1 * | 7/2007 | Dayan et al. | 713/2 |
| 2009/0210520 A1 * | 8/2009 | Maeno | 709/221 |

FOREIGN PATENT DOCUMENTS

| | | | |
|---|---|---|---|
| JP | 2002149439 A | 5/2002 | |
| JP | 2003076623 A | 3/2003 | |
| JP | 2004280738 A | 10/2004 | |
| JP | 2004287945 A | 10/2004 | |

(Continued)

OTHER PUBLICATIONS

International Search Report for PCT/JP2007/070481 mailed Jan. 29, 2008.

(Continued)

*Primary Examiner* — Hassan Kizou
*Assistant Examiner* — Roberta A Shand

(57) ABSTRACT

A proxy server in an SIP network includes the common SIP proxy server function 11, the function of determining whether an SIP request and an SIP response received by the proxy server 10 belong to a call flow encountering a failure of the working SIP server 30, and the function of, when determination is made that they belong to a call flow encountering a failure, referring to the contents of the received SIP request and SIP response to specify a destination to which the SIP request and the SIP response are to be transmitted next.

28 Claims, 16 Drawing Sheets

FOREIGN PATENT DOCUMENTS

| | | | |
|---|---|---|---|
| JP | 2005229273 A | 8/2005 | |
| JP | 2005339550 A | 12/2005 | |

OTHER PUBLICATIONS

Y. Chimura et al., "Session Initiation Protocol Textbook", Impress R&D Incorporation, p. 76-77, 2004.

"Technical Specifications on Basic Call Interface for SIP Terminals Connecting with Provider's SIP Network", The Telecommunication Technology Committee, Technical Specification No. TS-1006, sec.5, Oct. 27, 2004.

Japanese Office Action for JP 2006-286189 issued Nov. 20, 2009.

* cited by examiner

FIG. 15

| SESSION IDENTIFIER | CLIENT ADDRESS | SERVER ADDRESS | CLIENT TRANSMITTED PACKET BUFFER | SERVER TRANSMITTED PACKET BUFFER |
|---|---|---|---|---|
| 1 | | | | PACKET |
| 2 | | | PACKET PACKET | |
| 3 | | | | |
| ... | | | ... | ... |

111, 112, 113, 114, 115

110-1, 110-2, 110-3

US 8,374,079 B2

PROXY SERVER, COMMUNICATION SYSTEM, COMMUNICATION METHOD AND PROGRAM

INCORPORATION BY REFERENCE

This application is the National Phase of PCT/JP2007/070481, filed Oct. 19, 2007, which claims priority based on Japanese Patent Application No. 2006-286189 filed on Oct. 20, 2006 and incorporates all the disclosure of the same.

TECHNICAL FIELD

The present invention relates to a proxy server, a communication system, a communication method and a program which are preferably used in a communication network that executes signaling by using SIP (Session Initiation Protocol).

BACKGROUND ART

In recent years, as in VoIP (Voice over IP), real time communication using an IP network has been widely used. There is an increasing number of cases where SIP (Session Initiation Protocol) is adopted as an international standard protocol for setting up connection between terminals at the opposite ends which execute real time communication such as a telephone terminal or a personal computer. In the present specification, a communication network in which signaling is executed using SIP is referred to as an SIP network.

Common structure of an SIP network is recited in Literature 3. An SIP network is formed of a location server, an SIP server and a user agent (UA). The user agent is described on page 76 of Literature 3 (which will be described later) as "SIP is based on a client-server model between end systems. Equivalent to the end system is a user agent (UA). User agent, which is more specifically an end system such as a telephone set or a personal computer, realizes services by transmitting and receiving a request and a response to/from these end systems". In the present specification, the request recited in the above description will be referred to as an SIP request and a response as an SIP response.

As recited on page 77 of Literature 3, the SIP server has (1) a proxy server function of relaying an SIP request and an SIP response, (2) a redirect server function for use in inquiry of a destination of an SIP request, and (3) a registration server function of accepting registration of user agent information on an SIP network. Here, user agent information is, for example, URI (Uniform Resource Identifier) which is an identifier for accessing a user agent or an IP address to be used by a user agent. In the present specification, user agent information registered at the SIP server by a user agent will be referred to as registration information. The registration information is updated by using a REGISTER request as an SIP request.

Shown in FIG. 12 is an operation sequence in a case where user agents communicate with each other in a common SIP network. The figure, as recited in Literature 4 (which will be described later), includes an authentication method (digest authentication) of a user agent adopted when a common information communication provider sets up an SIP network.

First, a user agent (a calling side) transmits an INVITE request to an SIP server. In the present specification, an INVITE request transmitted first to the SIP server by the user agent (calling side) will be referred to as an initial INVITE request.

The SIP server having received the initial INVITE request from the user agent (calling side) calculates a nonce for use in digest authentication and returns an SIP response (407 proxy authentication required) with the nonce value added to the user agent (calling side). The user agent (calling side) hashes a secret (user identifier and a password) with the received nonce as a key. The result is stored in an Authorization header of an INVITE request and the obtained request is transferred to the SIP server. In the present specification, an INVITE request with an Authorization header added will be referred to as an authentication INVITE request.

The SIP server having received the authentication INVITE request executes authentication processing of the user agent (calling side). More specifically, (1) similarly to the user agent (calling side), hash a user identifier and a password of the user agent (calling side) by using own generated nonce value. (2) Compare the obtained result with an Authorization header value stored in the authentication INVITE request from the user agent (calling side) and when they coincide with each other, determine that the request is an authentication INVITE request from a proper user agent.

When as a result of the authentication processing, determining that it is an authentication INVITE request from a proper user agent, the SIP server transfers the authentication INVITE request to a user agent on a call arrival side (the user agent (call arrival side) in FIG. 12) designated by a To field.

Thereafter, after receiving the authentication INVITE request, the user agent (call arrival side) returns a provisional response (100 trying and 180 Ringing in FIG. 12) indicative of being in continuation of processing of the authentication INVITE request to the SIP server to call up a caller.

When the caller responds, the user agent (call arrival side) returns an SIP response (200 OK) indicative of completion of the processing of the authentication INVITE request to the SIP server. The user agent (calling side) issues an ACK request for informing the user agent (call arrival side) of the reception of the SIP response (200 OK) which is a final response to the authentication INVITE request. This leads to set-up of a session for a call between the user agent (calling side) and the user agent (call arrival side). At the time of completion of the call, a user agent who wants to end the call (the user agent (calling side) in FIG. 12) issues a BYE request for ending the session. By returning the SIP response (200 OK) after the BYE request processing, the user agent (call arrival side) having received the BYE request through the SIP server informs the completion of the session ending processing. As a result, the call between the user agent (calling side) and the user agent (call arrival side) ends.

A series of flow of the SIP response (200 OK) indicative of the end of the processing from the initial INVITE request to the BYE request shown in FIG. 12 is referred to as a "call flow (a flow of calling) in general, which is identified by a value of a Call-ID header stored in an SIP request and an SIP response. In other words, all the SIP requests and the SIP responses shown in FIG. 12 will hold the same Call-ID header value. Moreover, a common information communication provider needs to manage who is calling with whom in order to charge for the calling. Therefore, the SIP server is realized as a call stateful proxy that manages in which state of a call flow a generated call is. As a result, as shown in FIG. 12, all the SIP requests and the SIP responses in the call flow will pass through the same SIP server.

In order to realize high availability of a server which manages a state of processing of a series of requests transmitted from a client such as a state of a call at the above-described SIP server, there exists as a means for succeeding to contents of processing by a server by other server at the time of a failure of the server which is disclosed in Japanese Patent Laying-Open No. 2004-280738 (Literature 1). In the following, Literature 1 as one example of the related art will be described in detail with reference to the drawings. Reference numerals indicating the respective components which are illustrated in the figures showing the related art are different from the reference numerals indicative of the respective components shown in the specification of the present invention.

FIG. 13 is a diagram showing a structure of a proxy response device disclosed in Literature 1. In FIG. 13, the proxy response device recited in Literature 1 provides a function of monitoring occurrence of a failure of a plurality of servers and when a certain server develops a fault, causing other server to succeed to processing of the server developing a fault. For realizing the function, the proxy response device is described to have a unit set forth in the following.

"The proxy response device of the present invention has a unit which holds an address of a monitoring target server whose failure occurrence is to be monitored and of a spare server capable of responding in place of the monitoring target server to obtain a message transmitted and received by the monitoring target server from a communication network, a unit which detects a failure of the monitoring target server, a unit which, at the detection of a failure of the monitoring target server, rewrites, as to a message not responded among the obtained messages of a request from a client, a transmission source address into an address of the above-described proxy response device and transmits the obtained message to the spare server, and a unit which rewrites a transmission source address of a response message from the spare server into the address of the monitoring target server and relays the obtained message to the client." (the paragraph 0012 in Literature 1 cited).

Shown in FIG. 14 is a hardware structure of an information processing device which realizes such a proxy response device. In FIG. 14, the structure is described as shown in the following.

"The information processing device realizing a proxy response device 1 includes a processor 100, a storage device 108, an input circuit interface 105 and an output circuit interface 107 which are to be connected to an IP network 6b, a reception buffer 104 for temporarily accumulating an IP packet received at the input circuit interface 105, a transmission buffer 106 for temporarily accumulating an IP packet to be transmitted by the output circuit interface 107, and an internal communication line such as a bus which connects these units. The storage unit 108 stores a program memory 101, a packet buffer 102 and a server management table 103. Recorded in the program memory 101 are various kinds of control programs which are executed by the processor 100 for realizing the proxy response device 1, and accumulated in the packet buffer 102 is an IP packet transmitted and received by a client 3 and servers 2a and 2b. The storage device 108 is formed of a semiconductor storage device or an external storage device such as a hard disk." (the paragraph 0019 in Literature 1 cited).

In addition, thus structured proxy response device comprehends a processing condition of a server by introducing packet buffer management function set forth below in order to cause other server to succeed to processing contents of a server developing a fault, which is described as follows.

"The proxy response device 1 comprises the packet buffer 102 for managing a message transmitted and received between the client 3 and the servers 2a and 2b, which manages, in the lump, a message of a request transmitted by the client 3 and a message of a response from the servers 2a and 2b corresponding thereto as one unit (hereinafter referred to as a session). Session is registered in a session management entry 110-1, 110-2, . . . of the packet buffer 102." (the paragraph 0022 in Literature 1 cited).

Example of a structure of the packet buffer is as shown in FIG. 15, which is described as follows.

"Each entry of the packet buffer 102 is formed of a session identifier 111, a client address 112, a server address 113, a client transmitted packet buffer 114 and a server transmitted packet buffer 115. The session identifier 111 is given a unitary identifier for identifying each entry. As the client address 112, an IP address of the client 3 which has transmitted a request is set. Set as the server address 113 is an IP address of the server 2a having received the request. In the client transmitted packet buffer 114, all the IP packets transmitted by the client 3 to the server 2a are stored as they are. Stored in the server transmitted packet buffer 115 are all the IP packets transmitted by the server 2a to the client 3 as they are (the paragraphs 0024 and 0025 in Literature 1 cited).

Next, operation of the proxy response device will be detailed with reference to the drawings.

FIG. 16 is a flow chart showing operation of the proxy response device. The operation is described as follows.

"All the IP packets flowing on the IP network 6b to which the proxy response device 1 is connected are obtained by the input circuit interface 105 and stored in the reception buffer 104. The processor 100, when there exists the above IP packet in the reception buffer 104, obtains one (step 170) and determines whether the obtained IP packet is related to the server 2a to be monitored based on whether a transmission source address 150 or a transmission destination address 151 of the above IP packet is coincident with a monitoring target server address 121 of the server management table 103. When failing to obtain an IP packet from the reception buffer 104 at Step 170, proceed to Step 175 (Step 171). When they are coincident, the processor 100 determines whether a packet kind 153 of the above IP packet is a cut-off request or not (Step 172) and when it is not a cut-off request, stores the above IP packet in a relevant entry of the packet buffer 102 (Step 173). The relevant entry is determined based on whether a pair of the transmission source address 150 and the transmission destination address 151 of the above IP packet is coincident with a pair of the client address 112 and the server address 113 (considered to be coincident even if the order is not the same). Storage destination will be, when a transmission destination of the above IP packet is a server, the client transmitted packet buffer 114 and will be the server transmitted packet buffer 115 when a transmission source of the above IP packet is a server. At this time, when there exists no relevant entry, generate a new entry. When the packet kind 153 is a cut-off request at Step 172, delete the relevant entry (Step 174). The processor 100 determines whether there exists a failure of a server having the monitoring target server address 121 in each entry of the server management table 103 (Step 175) and when there occurs a failure, executes proxy response processing (Step 177). Server failure existence determination method is not limited in particular, one example of which is monitoring all the sessions stored in the packet buffer 102 and when finding a session having no response from a server for a fixed time period, determining that the above server develops a fault. Another example is causing a server to execute a program of continuously transmitting a message indicative of no failure on the proxy response device 1, and when the proxy response device 1 fails to receive the message, determining that the server develops a fault. When first executing the proxy response processing in a certain session, execute processing preceding to a failure occurrence by using all the IP packets received to reproduce the same state. In addition, Step 177 is executed for each one IP packet to return to Step 170 after the execution." (the paragraphs 0036 through 0042 in Literature 1 cited).

Thus, the proxy response device disclosed in Literature 1 as one example of the related art is characterized in storing all the IP packets transmitted from a client and a server and at the time of failure occurrence in the server, transmitting all the IP packets preceding to the failure occurrence to other server in order by the proxy response device in place of the client, thereby reproducing, on other server, the same state as that as of the failure occurrence at the server. This means causes other server to succeed to processing of a request from a client which is yet to be completed at the server.

Next, recited in Japanese Patent Laying-Open No. 2005-229273 (Literature 2) is a system as related art for avoiding an interruption state of a telephone set when a server develops a fault in the same telephone system whose technical range is the same as that of the present invention.

FIG. 17 is a diagram showing a principle structure of a server back-up device recited in Literature 2. The structure of the server back-up device is described as follows. "FIG. 1" in the following description corresponds to "FIG. 17" in the present specification.

"FIG. 1 is a block diagram of a principle structure of a server back-up device according to the present invention. The figure shows a principle structure of a server back-up device which is located between a plurality of telephone terminals connected to a network, e.g. an IP telephone terminal, and a server that executes switching connection of a call between internal terminals of the network and a call with the outside and which executes back-up of the server, which server back-up device 1 comprises at least a server failure detection unit 2 and a message transfer unit 3. The server failure detecting unit 2 is for detecting a failure of a server, which is equivalent to a call state management unit and an SIP message reading unit which will be described later, for example. During a failure occurrence period, the message transfer unit 3 rewrites a destination address in a predetermined message sent from a terminal side for the communication between terminals in the network from an address of its own device to an address of the other party side terminal and directly transfers the message to the other party side terminal without passing through the server, which is equivalent, for example, to an SIP message rewriting unit. In the exemplary embodiment of the present invention, the back-up device 1 further comprises an end point storage unit, e.g. an end point table, for storing an end point name and an IP address as a terminal identifier corresponding to each of a plurality of IP telephone terminals, so that the message transfer unit 3 is allowed to transfer a message based on storage contents of the end point storage unit. Predetermined message may be an invite message to be sent to the other party side terminal for requesting set-up of a call. The server back-up device of the present invention also comprises a server failure detecting unit and a message generating unit, e.g. an SIP message generating unit, for generating a response message corresponding to and in response to a predetermined message sent from a terminal in the network during a failure occurrence period and transmitting the response message to a transmission source terminal of the predetermined message. In the present exemplary embodiment, a predetermined message may be a register message to be transmitted from a terminal side for registration of its own terminal. Also in the present exemplary embodiment, the server back-up device further comprises a predetermined message reception time storing unit, e.g. an active call table, for storing the number of receptions of the predetermined message from the same terminal, so that the server failure detecting unit is allowed to detect a failure of the server when the number of receptions of stored messages in question exceeds a number determined in advance." (the paragraphs 0010 through 0014 in Literature 2 cited).

Furthermore, shown in FIG. 18 is a structure of an entire system including the server back-up device recited in Literature 2. The server recited so far is equivalent to an IP Centrex server shown in FIG. 18. As illustrated in FIG. 18, with a spare system of the IP Centrex server not explicitly shown, the server back-up device is designed to be in charge of all the signaling from a user agent when the IP Centrex server develops a fault. In other words, the server back-up device transfers an SIP request from a user agent on a calling side to a user agent on a call arrival side. The server back-up device according to the exemplary embodiment therefore adopts a form of holding an end point storage unit for storing an end point name as an identifier of a user agent and an IP address of the user agent corresponding to each of a plurality of user agents in order to determine an IP address from an identifier of a user agent on a call arrival side such as a telephone number.

Next, operation of the server back-up device recited in Literature 2 will be described with reference to the drawings. FIG. 19 is a diagram showing operation executed when the IP Centrex server operates normally and FIG. 20 is a diagram showing operation executed when the IP Centrex server develops a fault.

These operations are described in Literature 2 as follows. In the following citation, "FIG. 4" is equivalent to "FIG. 19" in the present specification and "FIG. 5" is equivalent to "FIG. 20" in the present specification.

"FIG. 4 is a further detailed description of operation in the system when the Centrex server normally operates. Assume here that call-up from a terminal 121 starts a call with a terminal 122. An IP address of a back-up device 10 here is 111.1.1.10, an IP address of the terminal 121 is 111.1.1.1, an IP address of the terminal 122 is 111.1.1.2 and an IP address of an IP Centrex server 16 is 133.1.1.1. In FIG. 4, a session initiation protocol (SIP) message, for example, a register message or an invite message which will be described later, for setting up, maintaining and ending a session which is sent from the terminal 121 in FIG. 4 (1) reaches the back-up device 10 through a LAN 13, (2) is transferred by a path from the back-up device 10 to the IP Centrex server 16 via the LAN 13, a router 14 and an IP network 15, and (3) thereafter transferred to the back-up device 10 through a path leading from the IP Centrex server 16 to the back-up device 10 via the IP network 15, the router 14 and the LAN 13 and further transferred from the back-up device 10 to the terminal 122 through the LAN 13. Transmission and reception of an actual voice signal after connection of a call is completed between the terminals, that is, a media stream by the real time transport protocol (RTP) is executed directly between the terminals via the LAN 13 without passing through the back-up device 10. Also at the time of normal operation of the IP Centrex server 16, an actual voice signal is similarly transmitted and received directly between the terminals. FIG. 5 is a diagram for use in explaining operation executed at the time of the Centrex server failure occurrence in detail. Similarly to FIG. 4, when an invite message, for example, for setting up a call (1) is transferred to the back-up device 10 from the terminal 121 through the LAN 13, the back-up device 10 detects a failure occurring in the IP Centrex server 16 as will be described later and therefore, the back-up device 10 (2) directly transfers the message to the other party side IP telephone terminal 122 without transferring the same to the IP Centrex server 16 side to enable a call between two terminals. Transmission and reception of an actual voice signal after the completion of connection of a call between the terminals, that is, a media stream by the real time transport protocol, is directly executed between the terminals through the LAN 13 without passing through the pack-up device 10. Also at the time of normal operation of the IP Centrex server 16, an actual voice signal is similarly transmitted and received directly between the terminals." (the paragraphs 0022 through 0024 in Literature 2 cited).

Thus, the server back-up device recited in Literature 2, when a failure occurs at the IP Centrex server, refers to information of an end point name and an IP address to change a destination of a received SIP request and directly transfers the SIP request to the user agent, thereby avoiding an interruption state of telephone caused by a failure of the IP Centrex server.
Patent Literature 1: Japanese Patent Laying-Open No. 2004-280738.
Patent Literature 2: Japanese Patent Laying-Open No. 2005-229273.
Non-Patent Literature 1: "SESSION INITIATION PROTOCOL TEXTBOOK" edited by Yasubumi CHIMURA and Toshifumi MURATA, pp 77-78, 2004, edited by Impress R&D Incorporation.
Non-Patent Literature 2: "Technical Specifications on Basic Call Interface for SIP Terminals Connecting with Provider's SIP Network", Technical Specification No. TS-1006, 2004, edited by The Telecommunication Technology Committee.

The first problem is that the related art with the technique recited in Literature 1 as one example fails to normally end a call flow encountering a failure of a working SIP server.

The reason is that a state of the working SIP server at the time of failure occurrence cannot be reproduced on a spare SIP server.

Case where a state of the working SIP server at the time of failure occurrence cannot be reproduced on the spare SIP server is specifically illustrated. FIG. 21 is a sequence diagram showing an example where a state of the working SIP server cannot be reproduced by the spare SIP server in a case where a proxy response device is applied to an SIP network.

Shown in the figure is a case where there occurs a failure on the working SIP server after an SIP response (200 OK) indicative of the end of authentication INVITE request processing at a user agent (call arrival side) is transferred to a user agent (calling side) via the working SIP server.

In this case, the proxy response device transmits, to the spare SIP server, an initial INVITE request transmitted from the user agent (calling side) in order to reproduce a state of the working SIP server at the spare SIP server.

Then, the spare SIP server newly calculates a nonce value and transmits an SIP response (407 proxy authentication required) including the nonce value to the proxy response device. The proxy response device transmits the authentication INVITE request received from the user agent (calling side) to the spare SIP server.

The authentication processing at the spare SIP server, however, fails because a value stored in an Authentication header of the authentication INVITE request is hashed by using a nonce value generated by the working SIP server, so that it is different from that hashed by using a nonce value generated by the spare SIP server.

For the proxy response device failing to hold a user identifier and a password of the user agent (calling side) to avoid this situation, it is necessary to analyze the Authentication header value of the authentication INVITE request received from the user agent (calling side) to extract a user identifier and a password of the user agent (calling side). This, however, signifies breaking digest authentication, which is impossible.

As a result of the foregoing, the spare SIP server recognizes that a session of a call is yet to be set up between the user agent (calling side) and the user agent (call arrival side) although the user agent (calling side) and the user agent (call arrival side) are actually having a call. Even when the user agent (calling side) transmits a BYE request for ending the call at this state, the spare SIP server refrains from executing the BYE request because no session to be ended exists. Thus, a call flow encountering a failure of the working SIP server will not be ended normally.

The second problem is that in the related art with the technique recited in Literature 2 as one example, when a user agent makes a call at the occurrence of a failure in the Centrex server, no digest authentication can be executed.

The reason is that as shown in FIG. 12, although in digest authentication, it is necessary for the SIP server to calculate a nonce value for an initial INVITE request from a user agent (calling side) and return an SIP response (407 proxy authentication required) with the calculation result added to the user agent, the server back-up device recited in Literature 2 holds neither a function of calculating a nonce value nor a function of holding a user identifier and a password of the user agent, so that it is impossible to generate the SIP response (407 proxy authentication required).

The third problem is that in the related art with the technique recited in Literature 2 as one example, the degree of correspondence of the server back-up device with an increase in the number of user agents is low.

The reason is that according to the related art, for determining an IP address of a user agent (call arrival side), the server back-up device is designed to itself hold information of an identifier and an IP address of a user agent. As a result, as the number of user agents to be managed by the server back-up device is increased, a disk or a memory capacity for storing the information should be expanded.

The fourth problem is that in the related art with the technique recited in Literature 2 as one example, it is impossible to transfer an SIP request to other user agents than a user agent recited in information of an identifier and an IP address of a user agent held by the server back-up device.

The reason is that according to the related art, an IP address of a transfer destination of an SIP request is solved based on information held by the server back-up device. The problem, as recited in Literature 2 as "to this, when it fails to coincide with a value of an end point name in the end point table 23, refer to a value of Server Keep Alive and when the value is not less than 6, for example, generate a code 404 Not Found indicative of incapability of calling with the outside, set a transmission source address of an SIP message as a transmission destination address and transfer the transmission destination address, code and the SIP message to the SIP message generating unit 26. The SIP message generating unit 26 generates a message indicating that no connection to a communication partner side terminal is allowed and transmits the message to a terminal of the transmission source of the SIP message." (the paragraph 0054 in Literature 2 cited), is yet to be solved by the server back-up device, and a system which notifies the user agent that no SIP request can be transferred is adopted.

EXEMPLARY OBJECT

An object of the present invention is to provide a proxy server on an SIP network, which, even when encountering a failure of a working SIP server before a call flow involving digest authentication ends, ends the call flow normally, executes digest authentication of a newly generating call even at the occurrence of a failure of the working SIP server, flexibly copes with an increase in the number of user agents and has no limitation imposed on a transfer destination of an SIP request.

SUMMARY

According to a first exemplary aspect of the invention, a proxy server includes an SIP proxy server function of intervening an SIP message transmitted and received between a user terminal, and a working SIP (Session Initiation Protocol) server and a spare SIP server, a message kind determination function of determining a kind of received message, a transfer destination failure detection function of detecting and notifying a failure occurring on the working SIP server, a call failure encounter determination function of determining, based on a notification from the transfer destination failure detection function, whether a message received by the proxy server function belongs to a call flow encountering a failure of the working SIP server or not, and a destination setting function of setting, based on a notification from the transfer destination failure detection function and according to a failure occurrence situation of the working SIP server and a kind of message received by the proxy server function, a transfer destination of the message.

According to a second exemplary aspect of the invention, a communication system including working and spare SIP servers which transmit and receive an SIP message to/from a user terminal, and a proxy server which intervenes transmission/reception of the SIP message, wherein the proxy server includes an SIP proxy server function of intervening an SIP message transmitted and received between the user terminal, and the working SIP server and the spare SIP server, a message kind determination function of determining a kind of received message, a transfer destination failure detection function of detecting and notifying a failure occurring on the working SIP server, a call failure encounter determination function of determining, based on a notification from the transfer destination failure detection function, whether a message received by the proxy server function belongs to a call flow encountering a failure of the working SIP server or not, and a destination setting function of setting, based on a notification from the transfer destination failure detection function and according to a failure occurrence situation of the working SIP server and a kind of message received by the proxy server function, a transfer destination of the message.

According to a third exemplary aspect of the invention, a communication method at a proxy server which, for working and spare SIP servers that transmit and receive an SIP message to/from an external user terminal, intervenes transmission/reception of the SIP message, includes an intervening step of intervening an SIP message transmitted and received between the user terminal, and the working SIP server and the spare SIP server, a message kind determination step of determining a kind of message received at the intervening step, a transfer destination failure detection step of detecting and notifying a failure occurring on the working SIP server, a call failure encounter determination step of receiving a notification from the transfer destination failure detection step to determine whether a message received at the intervening step belongs to a call flow encountering a failure of the working SIP server or not, and a destination setting step of receiving a notification from the transfer destination failure detection step to set a transfer destination of a message according to a failure occurrence situation of the working SIP server and a kind of message received at the intervening step.

As described in the foregoing, the present invention attains the following effects.

The first effect is that processing of a call flow encountering a failure of the working SIP server can be normally ended.

This is because noting characteristics of SIP protocol codes that if an SIP request and an SIP response arrive at user agents on the opposite ends which make a call according to requirements, processing of a call flow can be continued, when receiving a message of an SIP request and an SIP response belonging to a call flow encountering a failure of a working SIP server, a proxy server refers to the contents of the SIP request and the SIP response and specifies a destination to which the message of the SIP request and the SIP response is to be transmitted next and transfers the request and the response in place of the working SIP server.

The second effect is that calling which involves digest authentication is enabled even when the working SIP server develops a fault.

This is because the proxy server detects occurrence of a failure of the working SIP server to change a transfer destination of a message of an SIP request so as to meet a failure occurrence condition of the working SIP server. As a result, when the working SIP server develops a fault, if the proxy server receives a message of an SIP request involving digest authentication such as an initial INVITE request or an initial REGISTER request, transferring the message to the spare SIP server enables digest authentication to be executed.

The third effect is that it is possible to flexibly cope with an increase in the number of user agents.

This is because a subsequent transfer destination of a message belonging to a call flow encountering a failure of the working SIP server is determined based on a kind of message received. As a result, the need of a disk or a memory that stores information for solving an IP address of a user agent which will be a transfer destination of a message of an SIP request is eliminated. Thus, an increase in the number of transfer destinations of a message of an SIP request such as a user agent will have no relation with solution processing of an IP address of a transfer destination.

The fourth effect is no limitation to a message transfer destination.

This is because, as described above, a subsequent transfer destination of a message belonging to a call flow encountering a failure of the working SIP server is determined based on a kind of message received. As a result, it will be unnecessary to hold information for solving an IP address of a transfer destination in the proxy server, so that there fundamentally fails to occur a situation where no transfer is possible to other transfer destination than that recited in the information.

BRIEF DESCRIPTION OF THE DRAWINGS

FIG. 15 is a diagram showing an example of a structure of a packet buffer according to the related art;

EXEMPLARY EMBODIMENT

First Exemplary Embodiment

A first exemplary embodiment of the present invention will be detailed with reference to the drawings.

Structure of the First Exemplary Embodiment

Figure 1:
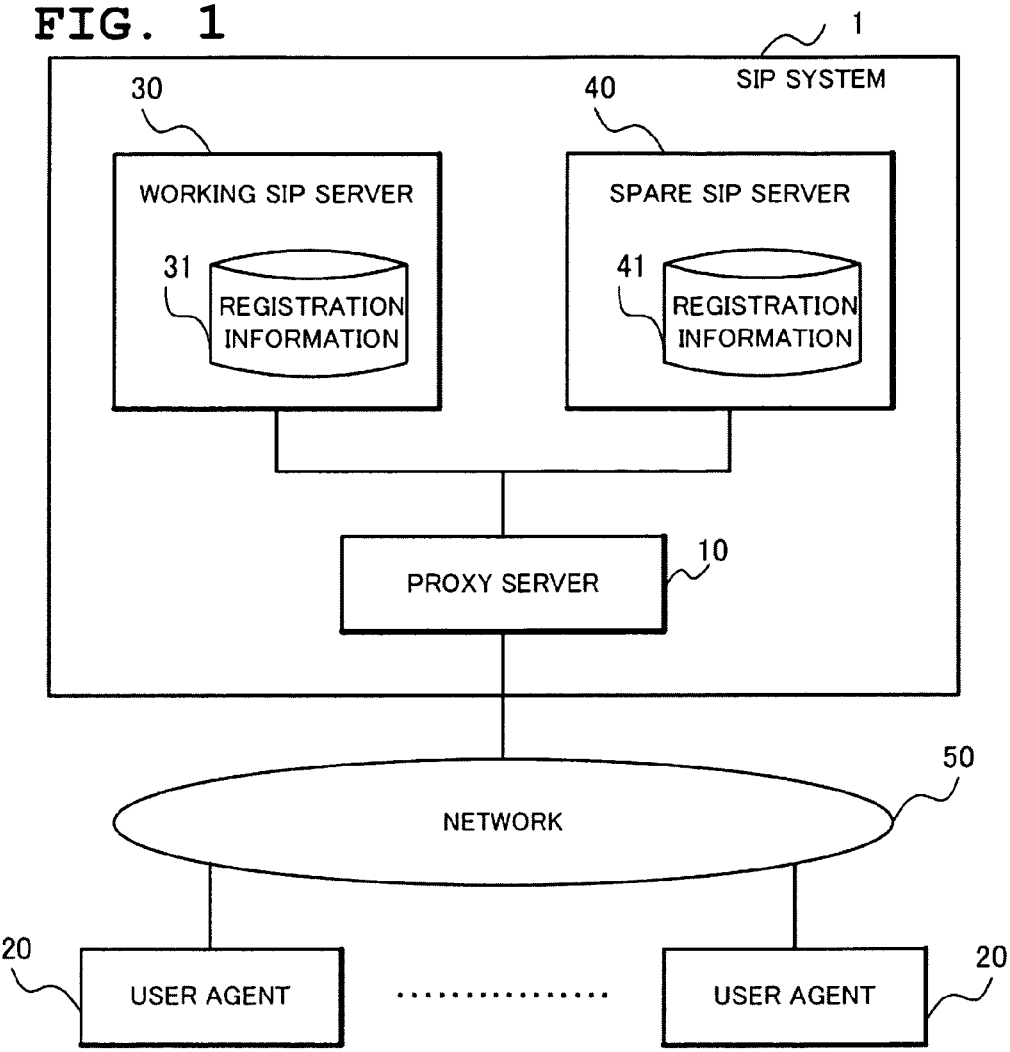
FIG. 1 is a block diagram showing a structure of a communication system according to a first exemplary embodiment of the present invention.

FIG. 1 is a block diagram showing a communication system according to the first exemplary embodiment of the present invention.

As shown in FIG. 1, in the communication system according to the first exemplary embodiment of the present invention, a proxy server 10 connected to a working SIP server 30 having registration information 31 and to a spare SIP server 40 on hot-standby having registration information 41 communicates with a user agent 20 through a network 50. Here, an SIP system 1 comprises the proxy server 10, the working SIP server 30 and the spare SIP server 40 and connects to the network 50.

Figure 2:
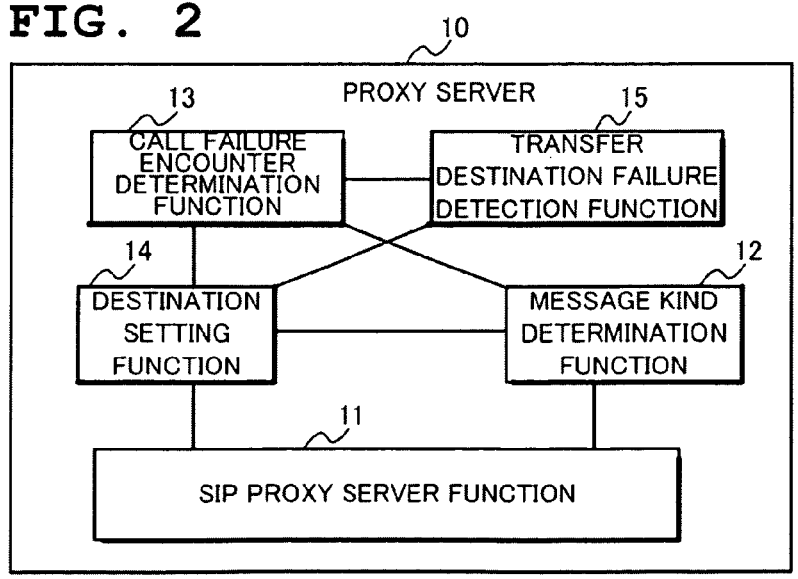
FIG. 2 is a block diagram showing a structure of a proxy server according to the first exemplary embodiment.

Next, FIG. 2 shows a block diagram of the proxy server 10 according to the first exemplary embodiment of the present invention.

As shown in FIG. 2, the proxy server 10 according to the first exemplary embodiment of the present invention comprises, in addition to a function that a common SIP proxy server has (an SIP proxy server function 11 in FIG. 2) as described above, a message kind determination function 12 of determining a kind of message received by the SIP proxy server function 11, a call failure encounter determination function 13 of determining whether a message received by the SIP proxy server function 11 belongs to a call flow encountering a failure of the working SIP server 30, a destination setting function 14 of setting a transfer destination of a message according to a failure occurrence condition of an SIP server or a kind of message received by the SIP proxy server function 11, and a transfer destination failure detection function 15 of detecting a failure occurring on the working SIP server 30 to notify the destination setting function 14 and the call failure encounter determination function 13 to that effect.

The destination setting function 14 holds a standard transfer destination to which transfer is made unless otherwise designated (hereinafter referred to as a standard transfer destination) as information. Set as the standard transfer destination is, for example, "the working SIP server 30" when the working SIP server 30 is in operation, and "the spare SIP server 40" when the working SIP server 30 develops a fault.

Furthermore, change of the standard transfer destination is executed by notifying the destination setting function 14 of a failure occurrence on the working SIP server 30 by the transfer destination failure detection function 15.

Failure occurrence detection with respect to the working SIP server 30 by the transfer destination failure detection function 15 can be realized on, for example, the means set forth below. For example, in SIP in general, the user agent 20 periodically transmits a REGISTER request to the SIP server so as to prevent registration information updated by a REGISTER request and managed by the SIP server from expiring. Therefore, under a condition where the number of pieces of registration information managed by one SIP server is on the order of several thousands to several ten thousands, the number of REGISTER requests arriving at the SIP server per second will be several hundreds in average. Moreover, the SIP server processes these REGISTER requests in every second to return a processing result to the user agent 20 as an SIP response. The transfer destination failure detection function 15 therefore monitors a REGISTER request and an SIP response transmitted and received between the SIP server and the user agent 20 per second to enable determination of a failure occurrence at the SIP server (or the network 50) when no SIP response is detected from the SIP server.

The call failure encounter determination function 13 holds a call identifier (Call-ID header value) 131 of an initial INVITE request. The call identifier 131 is a call identifier (Call-ID header value) of an initial INVITE request externally received from the message kind determination function 12, which is notified to the call failure encounter determination function 13 by the message kind determination function 12.

Figure 3:
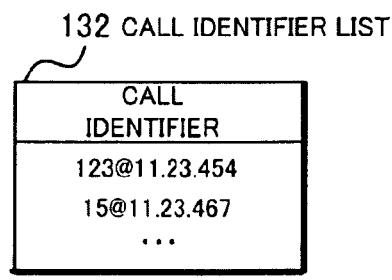
FIG. 3 is a diagram showing one example of a realization form of a call identifier list held by a call failure encounter determination function at the proxy server according to the first exemplary embodiment.

One example of a form of realization of the call identifier 131 preserved by the call failure encounter determination function 13 is shown in FIG. 3. In the present specification, a list of the preserved call identifiers 131 will be referred to as a "call identifier list 132".

Here, a hardware structure of the proxy server 10 will be described.

Figure 4:
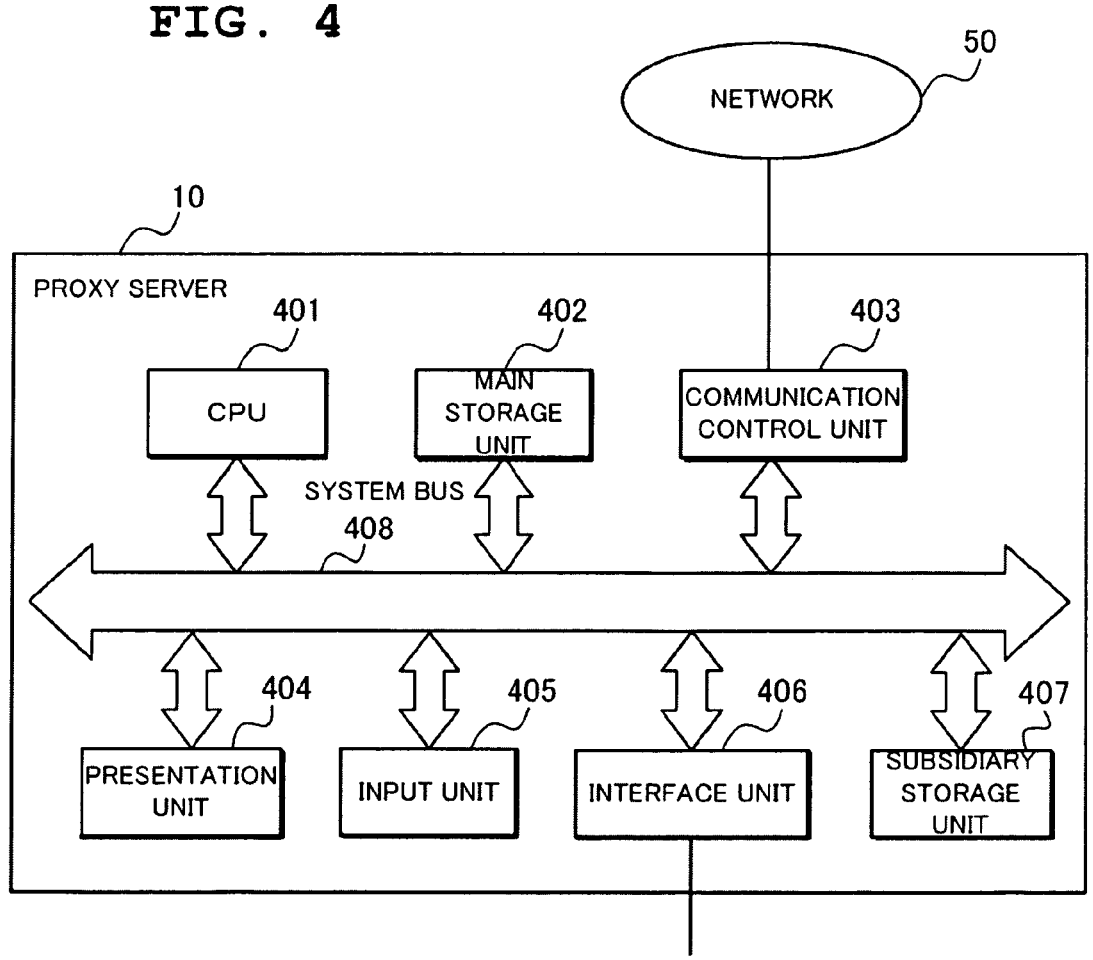
FIG. 4 is a block diagram showing a hardware structure of the proxy server of the communication system according to the first exemplary embodiment.

FIG. 4 is a block diagram showing a hardware structure of the proxy server 10 of the communication system according to the present exemplary embodiment.

With reference to FIG. 4, the proxy server 10 according to the present invention, which can be realized by the same hardware structure as that of a common computer device, comprises a CPU (Central Processing Unit) 401, a main storage unit 402, which is a main memory such as an RAM (Random Access Memory), for use as a data working region or a data temporary saving region, a communication control unit 403 for transmitting and receiving data through the network 50, a presentation unit 404 such as a liquid crystal display, a printer or a speaker, an input unit 405 such as a keyboard or a mouse, an interface unit 406 connected to a peripheral apparatus for transmitting and receiving data, a subsidiary storage unit 407 as a hard disk device formed of a non-volatile memory such as an ROM (Read Only Memory), a magnetic disk or a semiconductor memory, and a system bus 408 for connecting the respective components described above of the present information processing device with each other.

The proxy server 10 according to the present invention has its operation realized not only in hardware, with a circuit part mounted that is formed of a hardware part such as an LSI (Large Scale Integration) in which a program realizing such functions is incorporated but also in software by executing a program providing each function of the above-described respective components by the CPU 401 on a computer processing device.

More specifically, the CPU 401 loads the program stored in the subsidiary storage unit 407 onto the main storage unit 402 and executes the same to control operation of the proxy server 10, thereby realizing each of the above-described functions in software.

Operation of the First Exemplary Embodiment

Next, operation of the proxy server according to the first exemplary embodiment of the present invention will be detailed with reference to the drawings.

Figure 5:
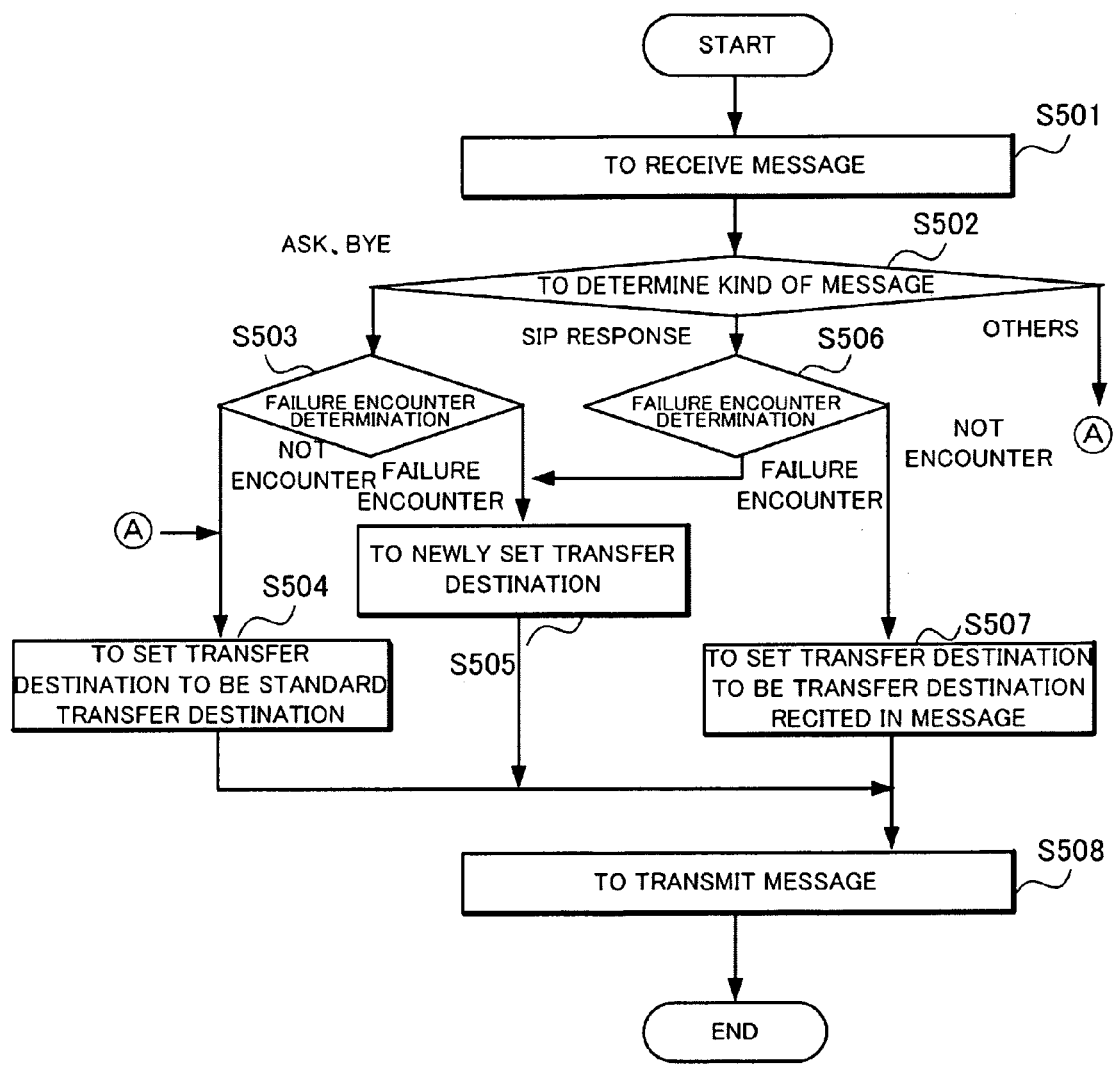
FIG. 5 is a flow chart showing operation of the proxy server according to the first exemplary embodiment.

FIG. 5 is a flow chart showing operation of the proxy server according to the first exemplary embodiment of the present invention.

Assume now that the SIP proxy server function 11 receives an external message (Step S501). Next, the message kind determination function 12 examines a kind of message received by the SIP proxy server function 11 (Step S502).

As a result of Step S502, when the received message is an SIP request (ACK or BYE), the call failure encounter determination function 13 further examines whether the above received message belongs to a call flow encountering a failure of the working SIP server 30 (Step S503).

The processing at Step S503 can be realized by the following units, for example. First, the message kind determination function 12 notifies the call failure encounter determination function 13 of the call identifier (Call-ID header value) 131 of an externally received initial INVITE request, so that the call failure encounter determination function 13 holds the received call identifier 131.

The call failure encounter determination function 13 preserves such call identifier list 132 as shown in FIG. 3. The contents of the call identifier list 132, when the transfer destination failure detection function 15 detects a failure occurring in the working SIP server 30, are once all erased by the call failure encounter determination function 13 which has been notified to that effect by the transfer destination failure detection function 15. This operation results in reciting, in the call identifier list 132, only a call identifier (Call-ID header value) 131 of a call flow newly generated at the time of operation of the working or spare SIP server. More specifically, when receiving an SIP request (ACK or BYE) or an SIP response holding the call identifier 131 not recited in the call identifier list 132 from the message kind determination function 12, the call failure encounter determination function 13 is allowed to determine that a call flow identified by the call identifier 131 in question encounters a failure of the working-SIP server 30.

As a result of Step S503, when the message received at Step S501 fails to encounter a failure occurrence in the working SIP server 30, the destination setting function 14 sets a transmission destination of the message received as a result of Step S501 to be a standard transfer destination (Step S504).

As a result of Step S503, when the determination is made that the message received at Step S501 belongs to a call flow encountering a failure of the working SIP server 30, newly determine a message transfer destination (Step S505).

This processing can be realized by units set forth below, for example. In an SIP request (ACK or BYE) and an SIP response, there exists a header (Via header or Record-Route header) for storing a message transfer path. In a case of an SIP request and an SIP response encountering a failure occurrence at the working SIP server 30, an address of the working SIP server 30 is recited in the header. Therefore, extract an address recited subsequently to the working SIP server 30 (e.g. an address of the user agent 20 on the call arrival side) from the header and take the address as a subsequent transfer address in order to directly transfer a message to the address.

Step S505 can be also realized by the following processing, for example. When destination headers (To header) of an SIP request and an SIP response are recited as a fully qualified domain name (FQDN), the destination determination function determines a subsequent transfer destination by executing address solution of a To header again from an external system such as DNS (Domain Name System) while ignoring a header value which stores a transfer path.

As a result of Step S502, when the message received at Step S501 is an SIP response, the call failure encounter determination function 13 further examines whether the received message belongs to a call flow encountering a failure (Step S506). Since the processing at Step S506 is the same as the processing at Step S503, no description will be made thereof.

As a result of Step S506, when the determination is made that the message received at Step S501 belongs to a call flow encountering a failure of the working SIP server 30, newly determine a message transfer destination (Step S505). The processing at Step S505 is as described above.

As a result of Step S506, when the message received at Step S501 is yet to encounter failure occurrence at the working SIP server 30, the destination setting function 14 determines a transmission destination of the message received as a result of Step S501 to be a transmission destination recited in the message (Step S507).

As a result of Step S502, when the message received at Step S501 is other than an SIP request (ACK or BYE) or an SIP response, the destination setting function 14 designates the transmission destination of the message received as a result of Step S501 as a standard transfer destination (Step S504).

To the transmission destination set by the destination determination function at Step S504, Step S505 and Step S507, the SIP proxy server function 11 transfers the message received at Step S501 (Step S508).

Next, detailed description will be made of operation of the entire system including the proxy server 10 according to the first exemplary embodiment of the present invention with reference to the drawings.

Figure 6:
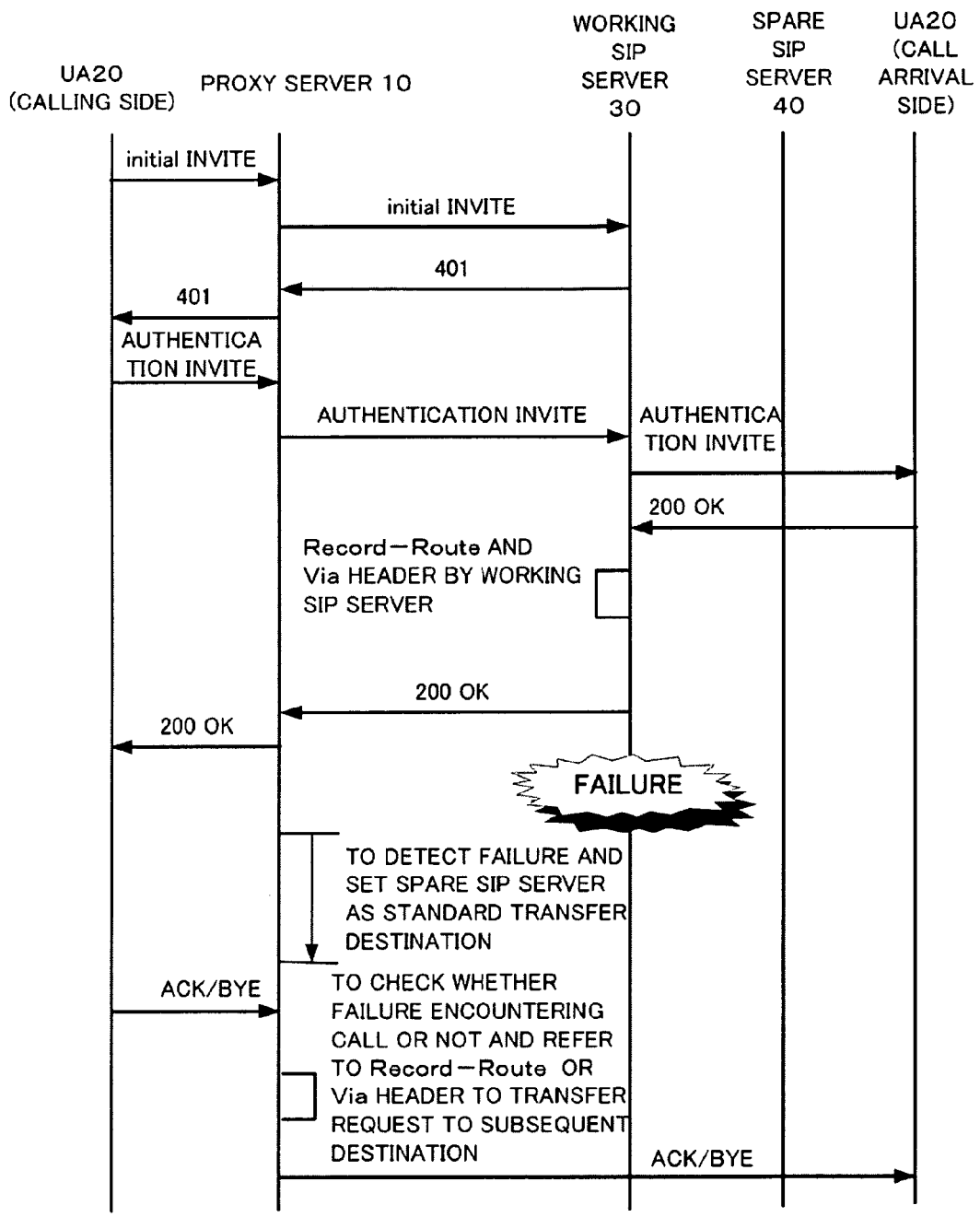
FIG. 6 is a sequence diagram showing operation of the entire system including the proxy server according to the first exemplary embodiment.
Figure 7:
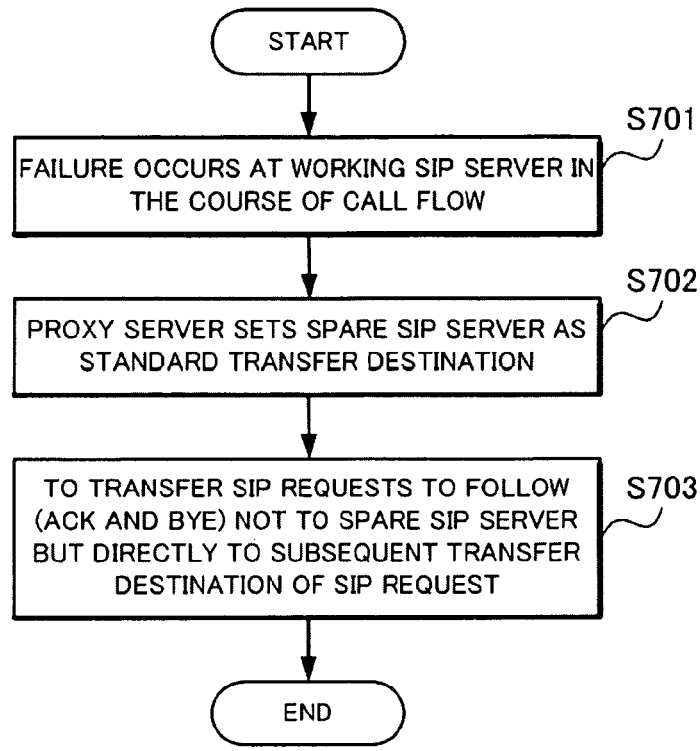
FIG. 7 is a flow chart showing operation of the entire system including the proxy server according to the first exemplary embodiment.

FIG. 6 is an operation sequence diagram showing operation of the entire system including the proxy server according to the first exemplary embodiment of the present invention and FIG. 7 is a flow chart of the same. As shown in FIG. 6 and FIG. 7, when there occurs a failure at the working SIP server 30 in the course of a call flow (after a call is established in FIG. 6) (Step S701), the proxy server 10 sets the spare SIP server 40 as a standard transfer destination (Step S702) and transfers the SIP requests to follow (ACK and BYE) not to the spare SIP server 40 but directly to a subsequent transfer destination of the SIP request (the user agent 20 (call arrival side) in FIG. 6) (Step S703).

Effects of the First Exemplary Embodiment

Thus, the present exemplary embodiment attains the following effects.

The first effect is that processing of a call flow encountering a failure of the working SIP server can be normally ended.

This is because noting characteristics of SIP protocol codes that if an SIP request and an SIP response arrive at user agents 20 on the opposite ends which make a call according to requirements, processing of a call flow can be continued, when receiving an SIP request and an SIP response belonging to a call flow encountering a failure of the working SIP server 30, the proxy server 10 refers to the contents of the SIP request and the SIP response and specifies a destination to which the SIP request and the SIP response are to be transmitted next and transfers the request and response in place of the working SIP server 30.

The second effect is that calling which involves digest authentication is enabled even when the working SIP server 30 develops a fault.

This is because the proxy server 10 detects occurrence of a failure of the working SIP server 30 to change a transfer destination of an SIP request so as to meet a failure occurrence condition of the working SIP server 30. As a result, when the working SIP server 30 develops a fault, if the proxy server 10 receives an SIP request involving digest authentication such as an initial INVITE request or an initial REGISTER request, transferring the request to the spare SIP server 40 enables digest authentication to be executed.

The third effect is that it is possible to flexibly cope with an increase in the number of user agents 20.

This is because a subsequent transfer destination of an SIP request and an SIP response belonging to a call flow encountering a failure of the working SIP server is determined based on contents of a header stored in received SIP request and SIP response. As a result, the need of a disk or a memory that stores information for solving an IP address of the user agent 20 which will be a transfer destination of the SIP request is eliminated. Thus, an increase in the number of transfer destinations of an SIP request such as the user agent 20 will have no relation with solution processing of an IP address of a transfer destination.

The fourth effect is no limitation to a transfer destination of an SIP request.

This is because, as described above, a subsequent transfer destination of an SIP request and an SIP response belonging to a call flow encountering a failure of the working SIP server 30 is determined based on the contents of a header stored in received SIP request and SIP response. As a result, it will be unnecessary to hold information for solving an IP address of a transfer destination in the proxy server 10, so that there fundamentally fails to occur a situation where no transfer is possible to other transfer destination than that recited in the information.

Second Exemplary Embodiment

Next, detailed description will be made of a proxy server according to a second exemplary embodiment of the present invention with reference to the drawings.

Structure of the Second Exemplary Embodiment

Figure 8:
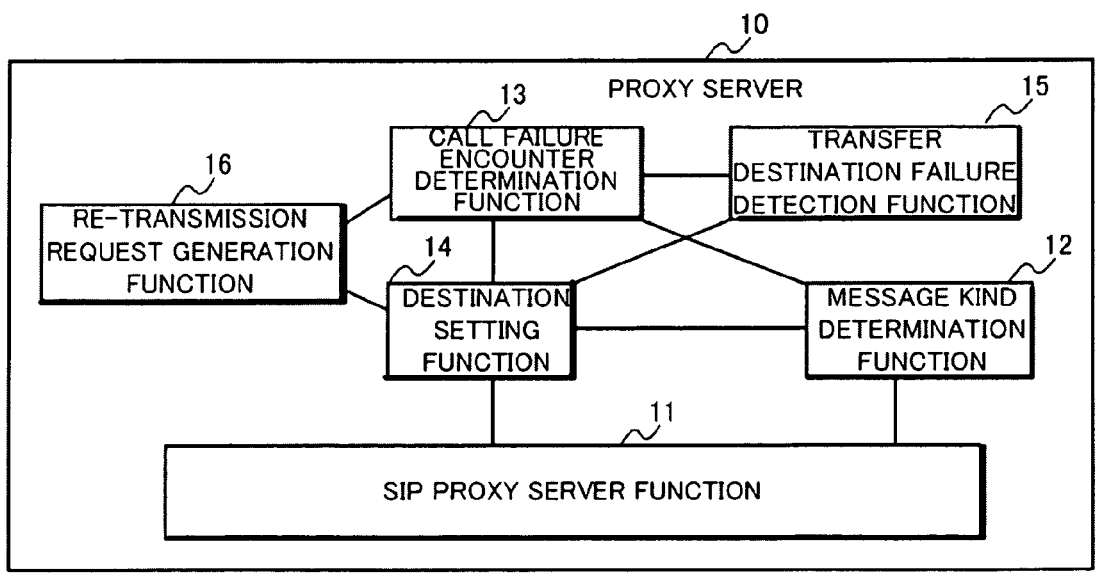
FIG. 8 is a block diagram showing a structure of a proxy server according to a second exemplary embodiment of the present invention.

FIG. 8 is a block diagram showing a proxy server 10 according to the second exemplary embodiment of the present invention.

As shown in FIG. 8, the proxy server 10 according to the second exemplary embodiment of the present invention has a re-transmission request generation function 16 added to the structure of the proxy server 10 according to the first exemplary embodiment of the present invention.

The re-transmission request generation function 16, when the working SIP server 30 develops a fault at the time of arrival of an authentication INVITE request, generates a re-transmission request to be transferred to the user agent 20 in order to urge the user agent 20 to re-transfer an initial INVITE request. Used as the re-transmission request, for example, is an SIP response (500 Server Internal Error) with a Retry-After header inserted. As a result of the reception of the SIP response, the user agent 20 will again transmit an initial INVITE request after a lapse of a period recited in the Retry-After header according to the common processing executed at the reception of an SIP response.

Operation of the Second Exemplary Embodiment

Next, detailed description will be made of operation of the proxy server 10 according to the second exemplary embodiment of the present invention with reference to the drawings.

Figure 9:
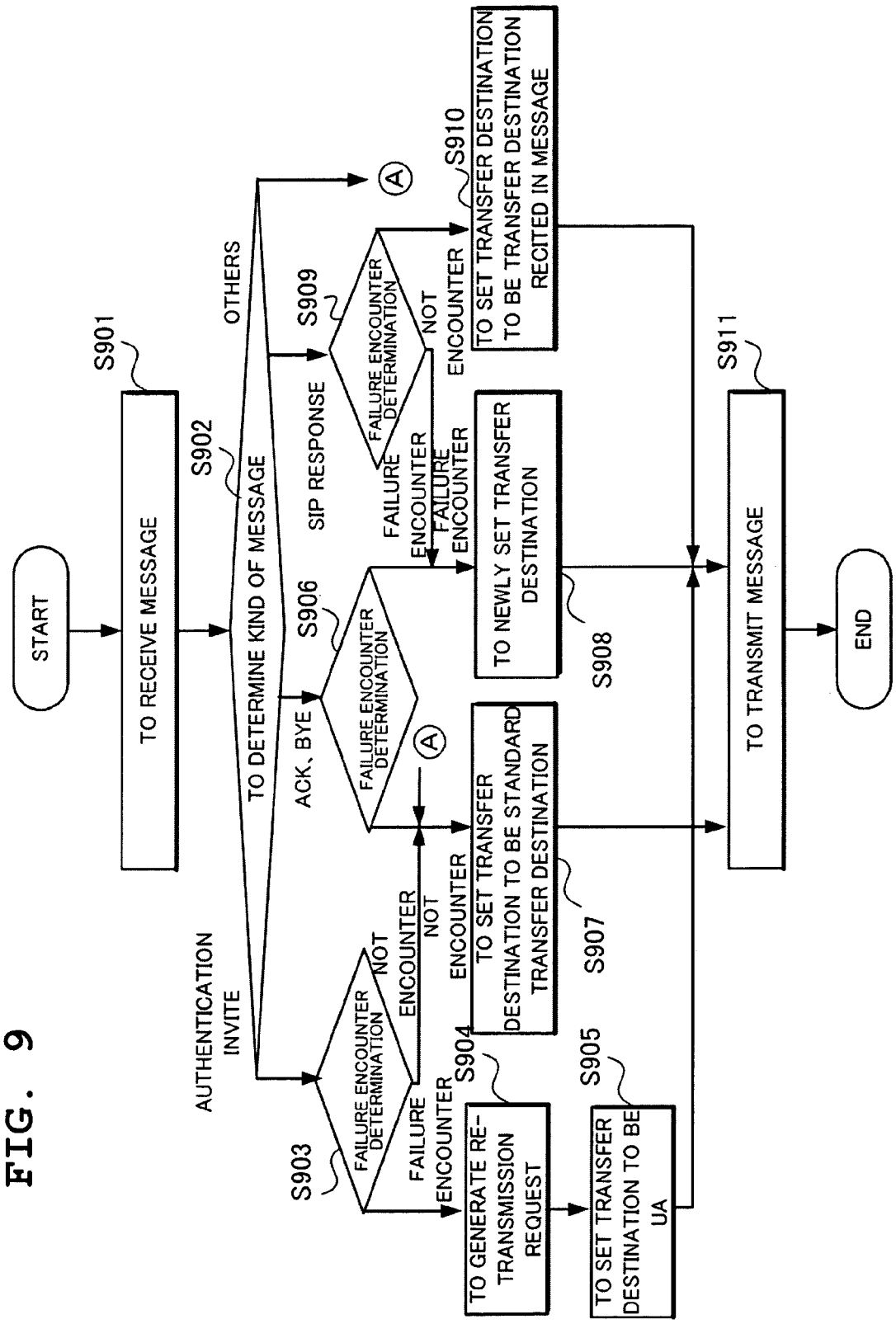
FIG. 9 is a flow chart showing operation of the proxy server according to the second exemplary embodiment.

FIG. 9 is a flow chart showing operation of the proxy server according to the second exemplary embodiment of the present invention.

As shown in FIG. 9, the operation of the proxy server 10 according to the second exemplary embodiment of the present invention has Step S903 through Step S905 including the re-transmission request generation processing of the re-transmission request generation function 16 added to the operation of proxy server 10 according to the first exemplary embodiment of the present invention. Since other steps than the steps including the re-transmission request generation processing according to the present exemplary embodiment have the same processing content, that is, Step S901 as that of Step S501 according to the first exemplary embodiment shown in FIG. 5, Step S902 as Step S502, Step S906 as Step S503, Step S907 as Step S504, Step S908 as Step S505, Step S909 as Step S506, Step S910 as Step S507, and Step S911 as Step S508, no description will be made thereof, and description will be made mainly of operation executed at Step S903 to Step S905.

As a result of Step S902, when a message received at Step S901 is an authentication INVITE request, the call failure encounter determination function 13 examines whether the received message belongs to a call flow encountering a failure (Step S903). Since the processing at Step S903 is the same as the operation Step S503 at the proxy server 10 according to the first exemplary embodiment of the present invention, no description will be made thereof.

As a result of Step S903, when the message received at Step S901 belongs to a call flow encountering a failure, the re-transmission request generation function 16 generates a re-transmission request to be transmitted to the user agent 20 (Step S904). The processing is executed by the following manner, for example. When a re-transmission request to be generated is an SIP response (500 Server Internal Error) with a Retry-After header inserted, use the value of the message received at Step S901 for a header other than the Retry-After header and use such a value as "30 seconds" for the Retry-After header. Thereafter, the destination setting function 14 sets a transfer destination of the re-transmission request to be the user agent 20 (Step S905). Thereafter, the SIP proxy server function 11 transfers the re-transmission request generated at Step S904 to the user agent 20 (Step S911).

Next, detailed description will be made of operation of the entire system including the proxy server according to the second exemplary embodiment of the present invention with reference to the drawings.

Figure 10:
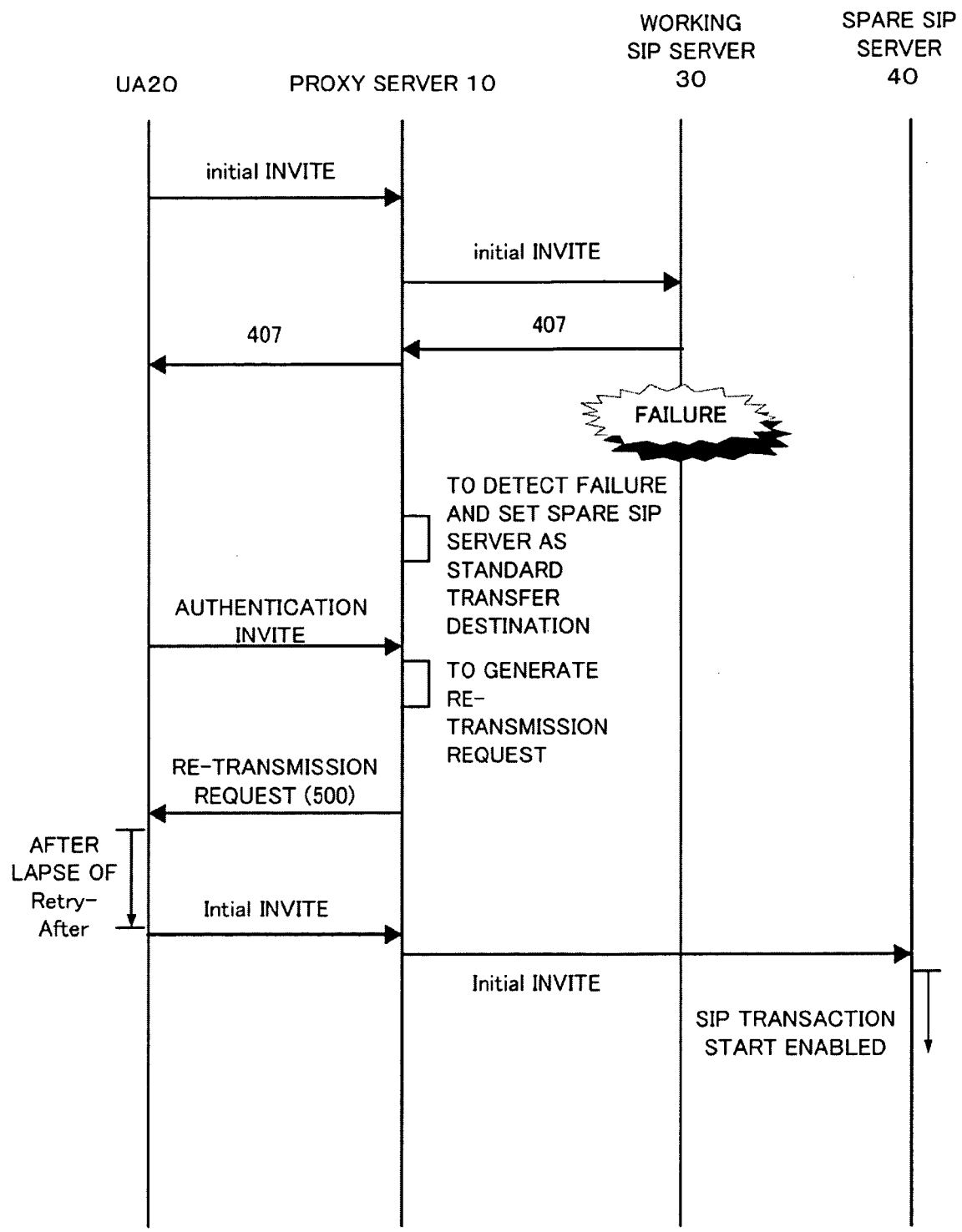
FIG. 10 is a sequence diagram showing operation of the entire system including the proxy server according to the second exemplary embodiment.
Figure 11:
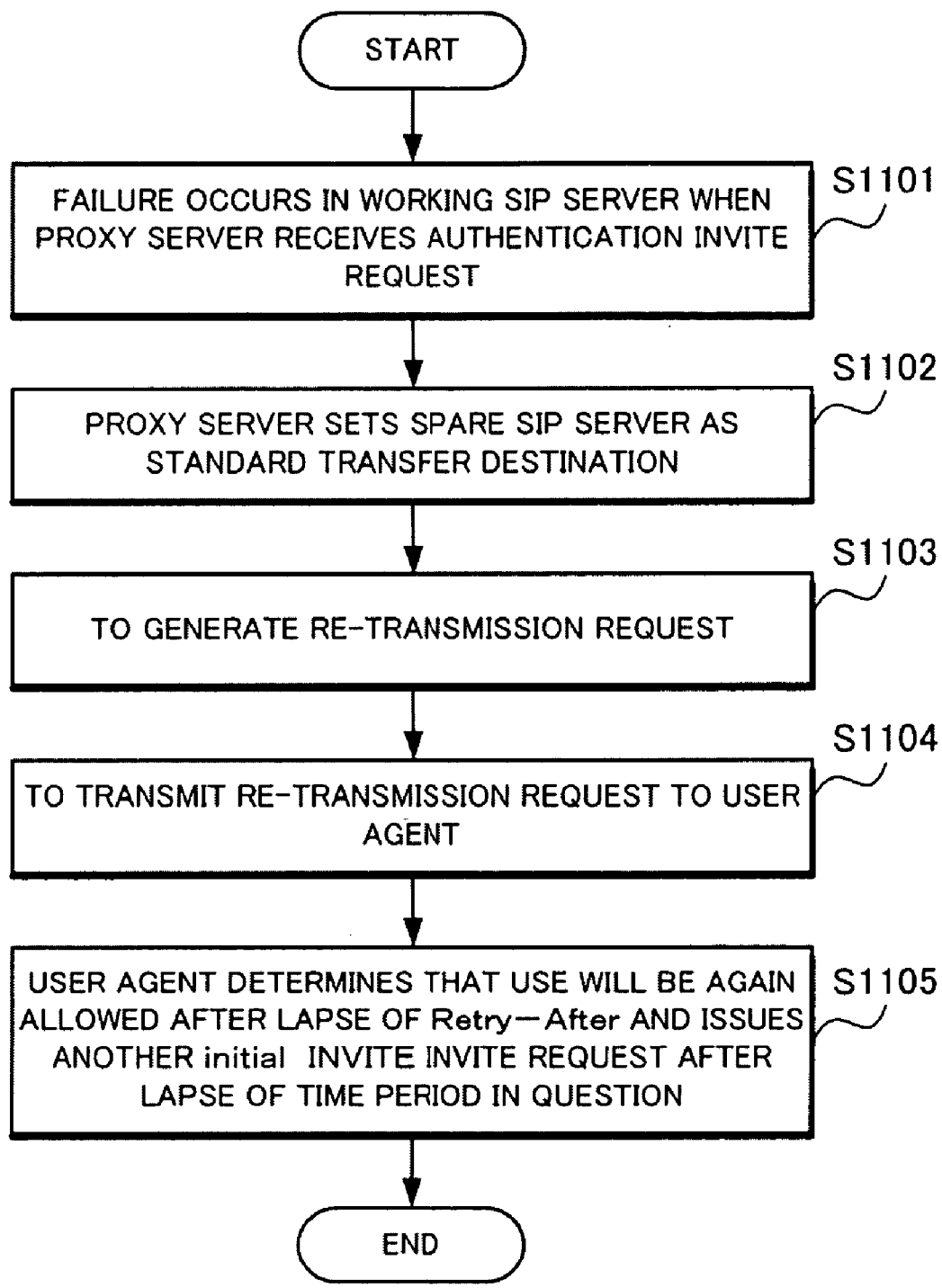
FIG. 11 is a flow chart showing operation of the entire system including the proxy server according to the second exemplary embodiment.
Figure 12:
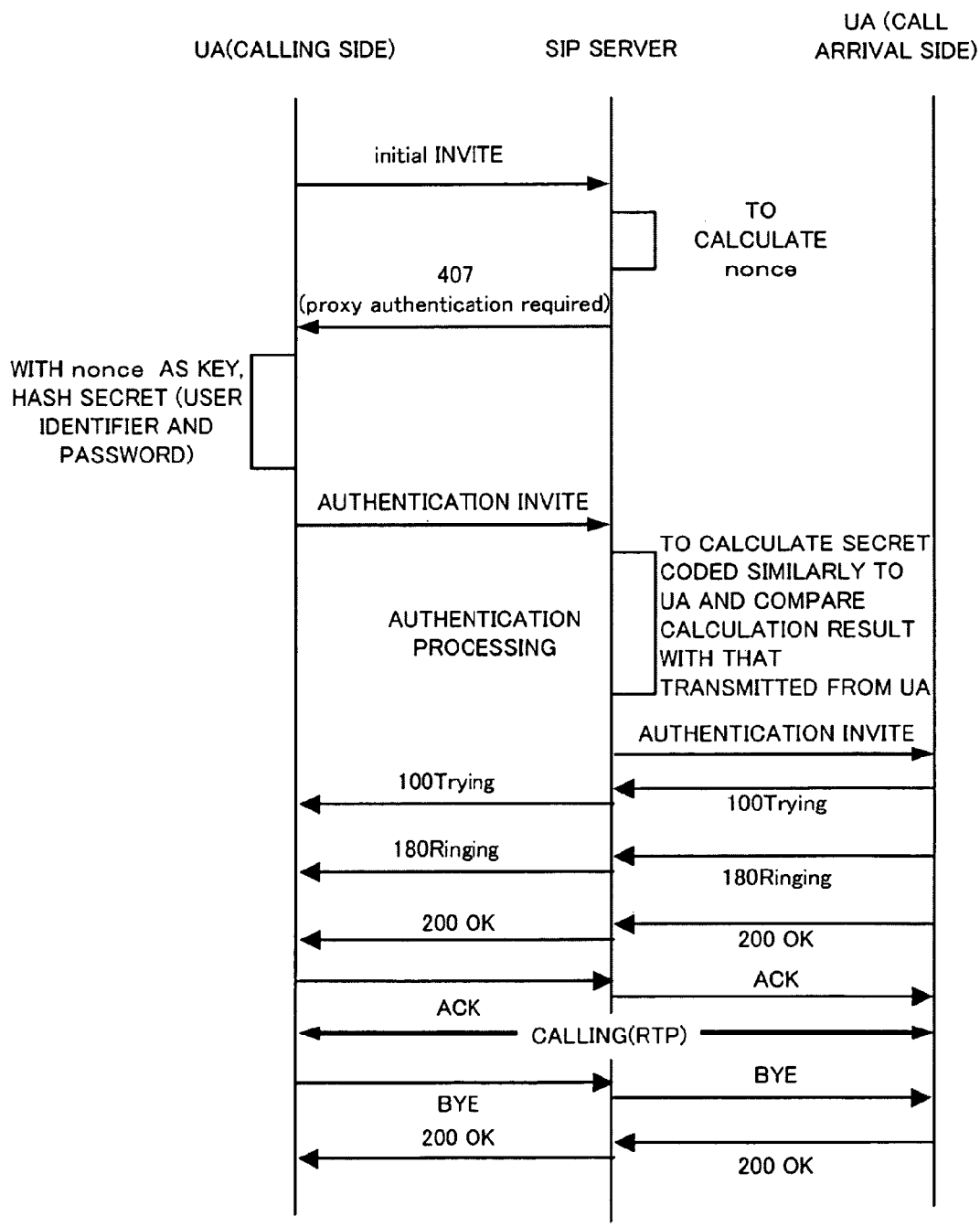
FIG. 12 is a sequence diagram of operation executed when user agents communicate with each other in a common SIP network according to related art.
Figure 13:
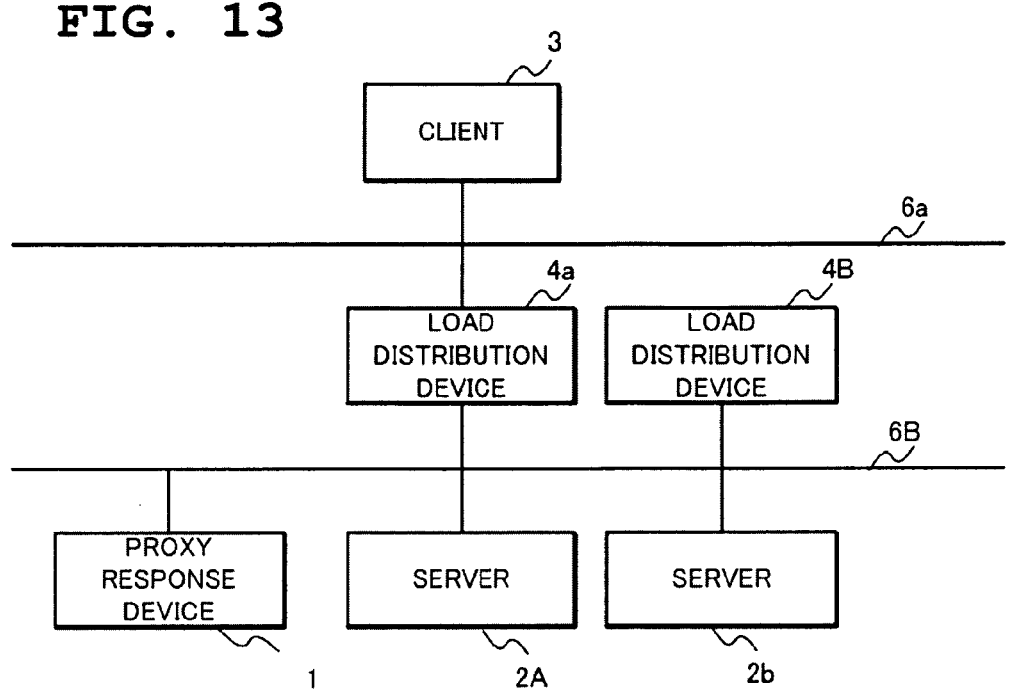
FIG. 13 is a block diagram showing a structure of an entire system including a proxy response device according to the related art.
Figure 14:
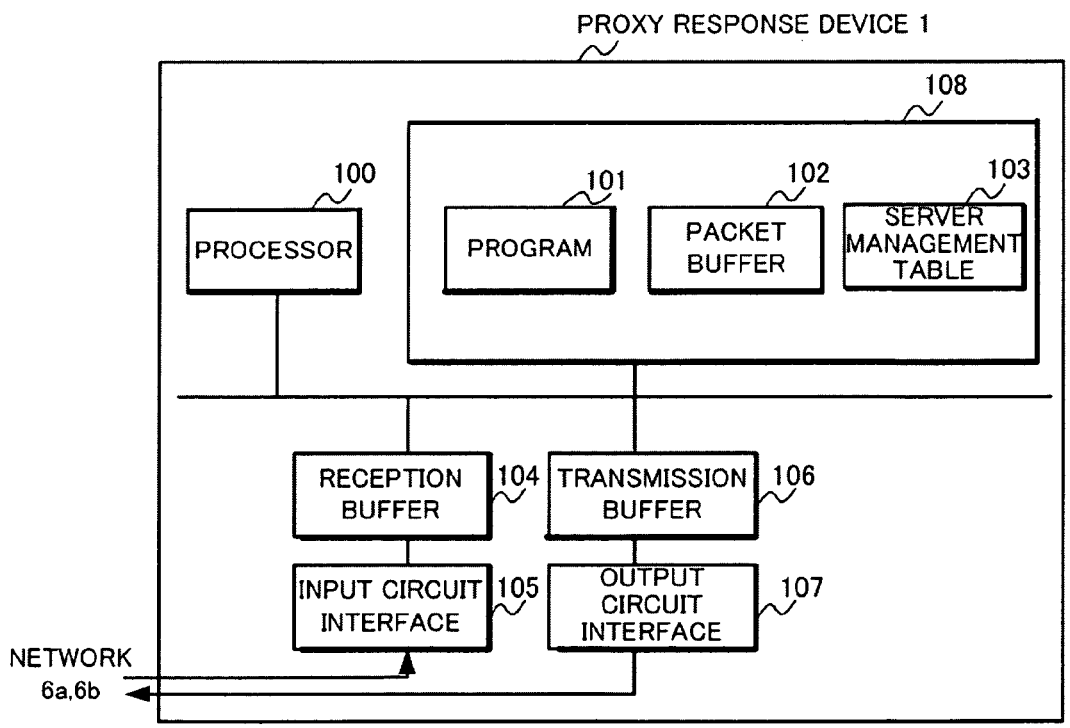
FIG. 14 is a block diagram showing a structure according to the related art.
Figure 16:
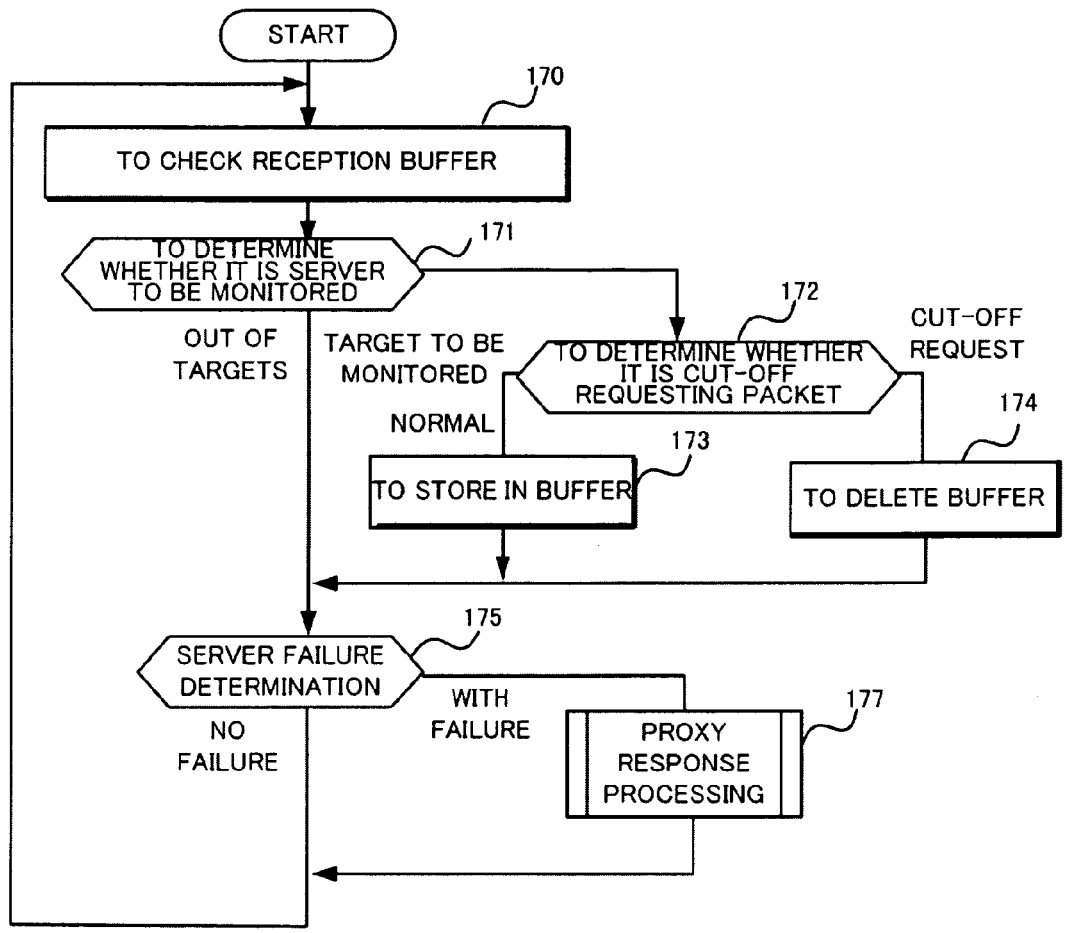
FIG. 16 is a flow chart showing operation of the related art.
Figure 17:
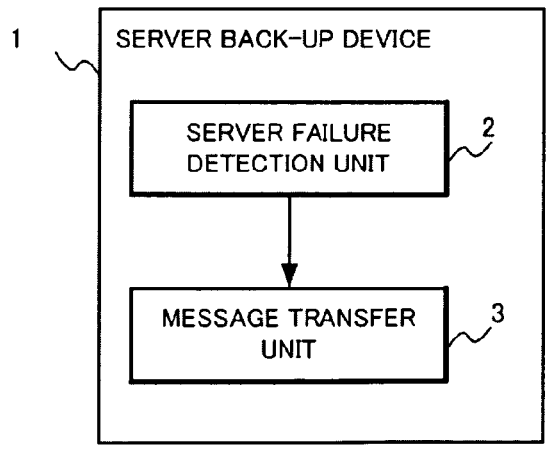
FIG. 17 is a diagram showing a principle structure of a server back-up device according to the related art.
Figure 18:
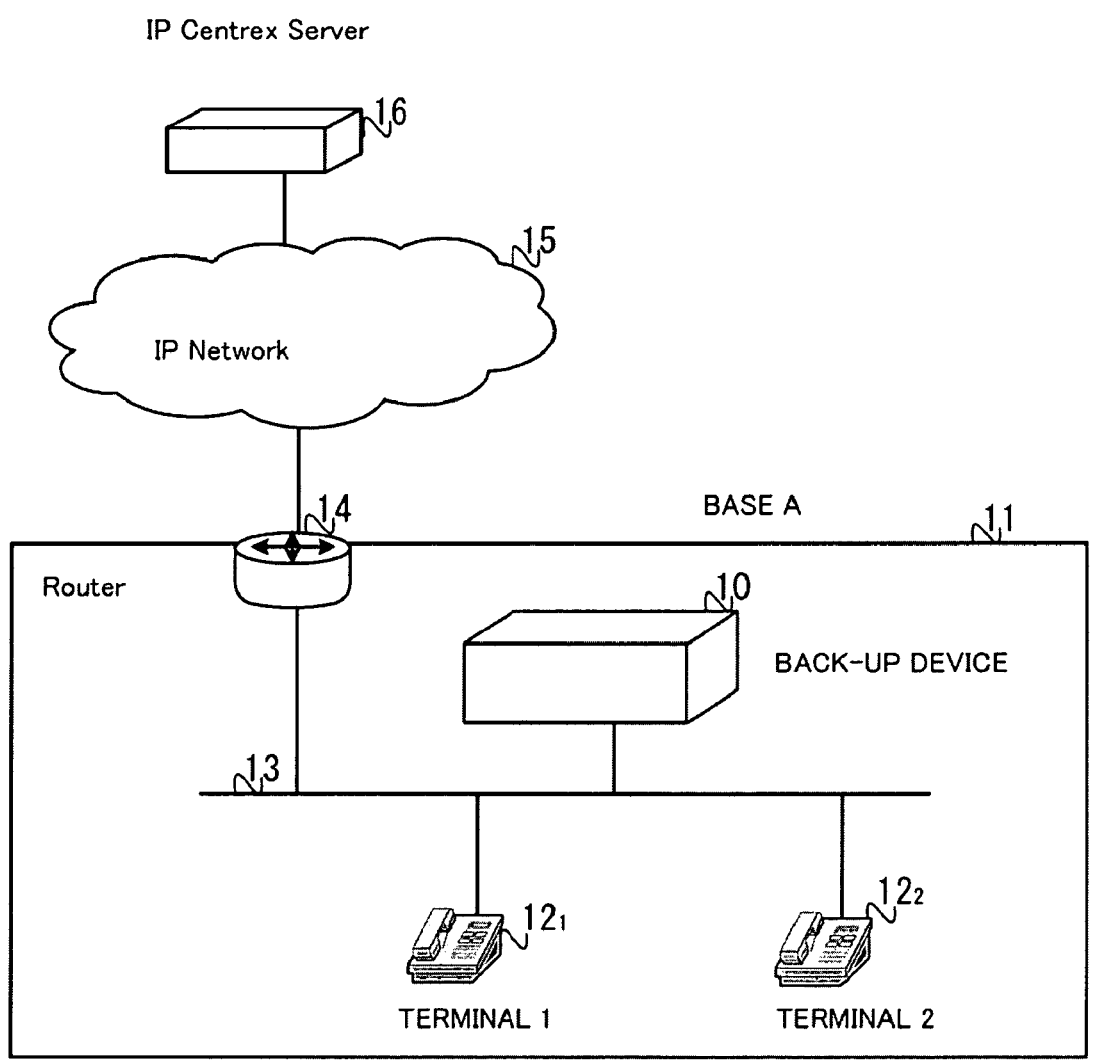
FIG. 18 is a diagram showing a structure of an entire system including the server back-up device according to the related art.
Figure 19:
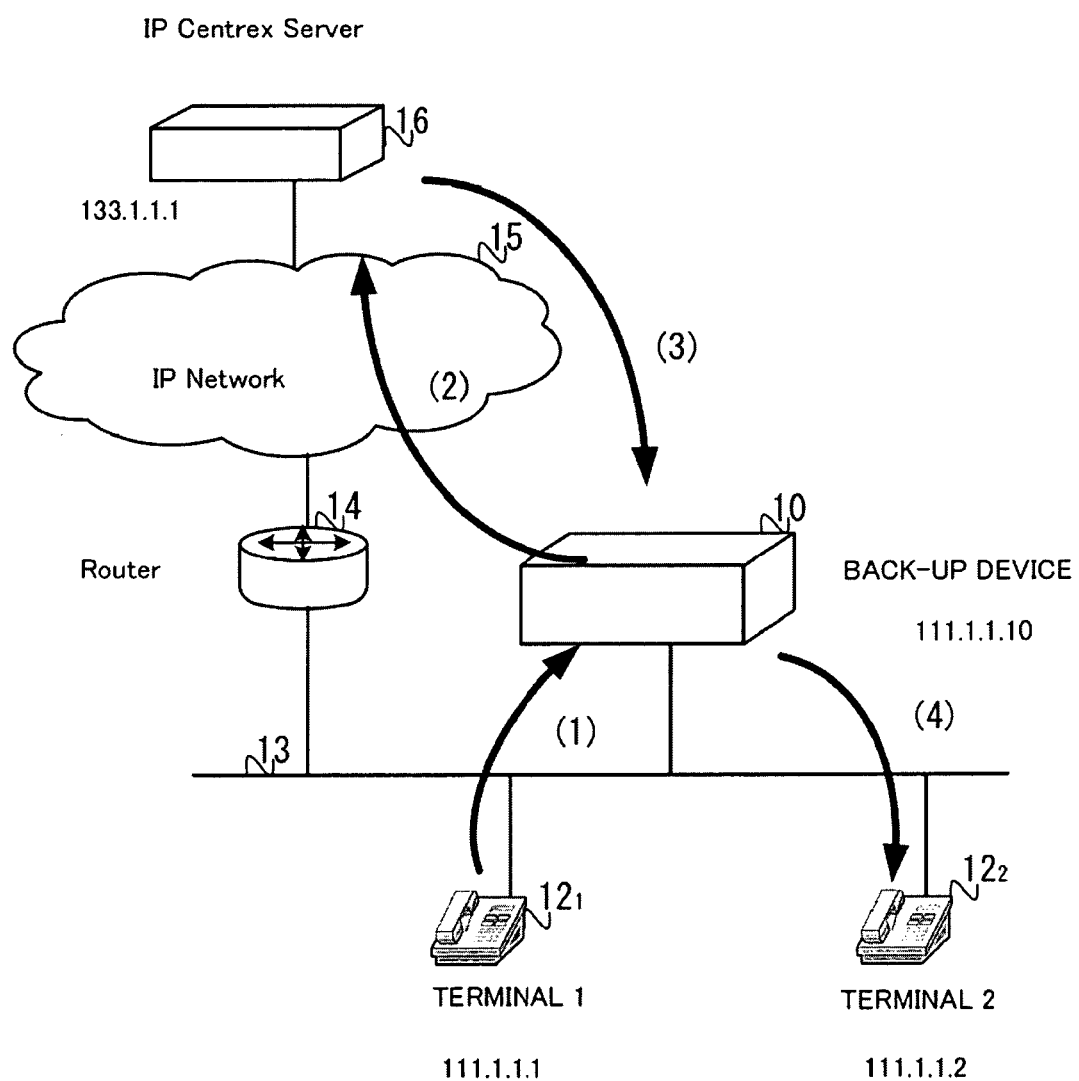
FIG. 19 is a diagram showing operation at the time of normal operation of an IP Centrex server in the server back-up device according to the related art.
Figure 20:
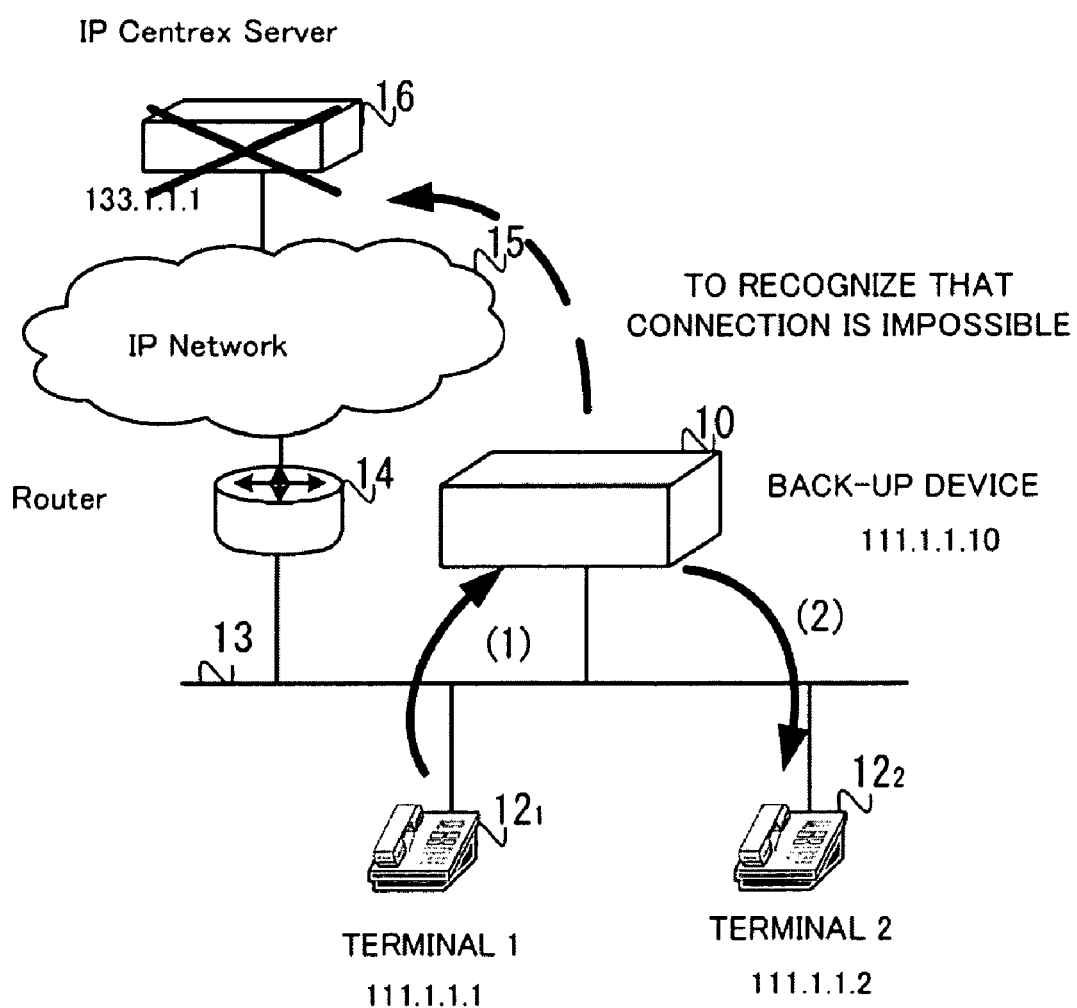
FIG. 20 is a diagram showing operation executed at the time of occurrence of a failure in the IP Centrex server in the server back-up device according to the related art.
Figure 21:
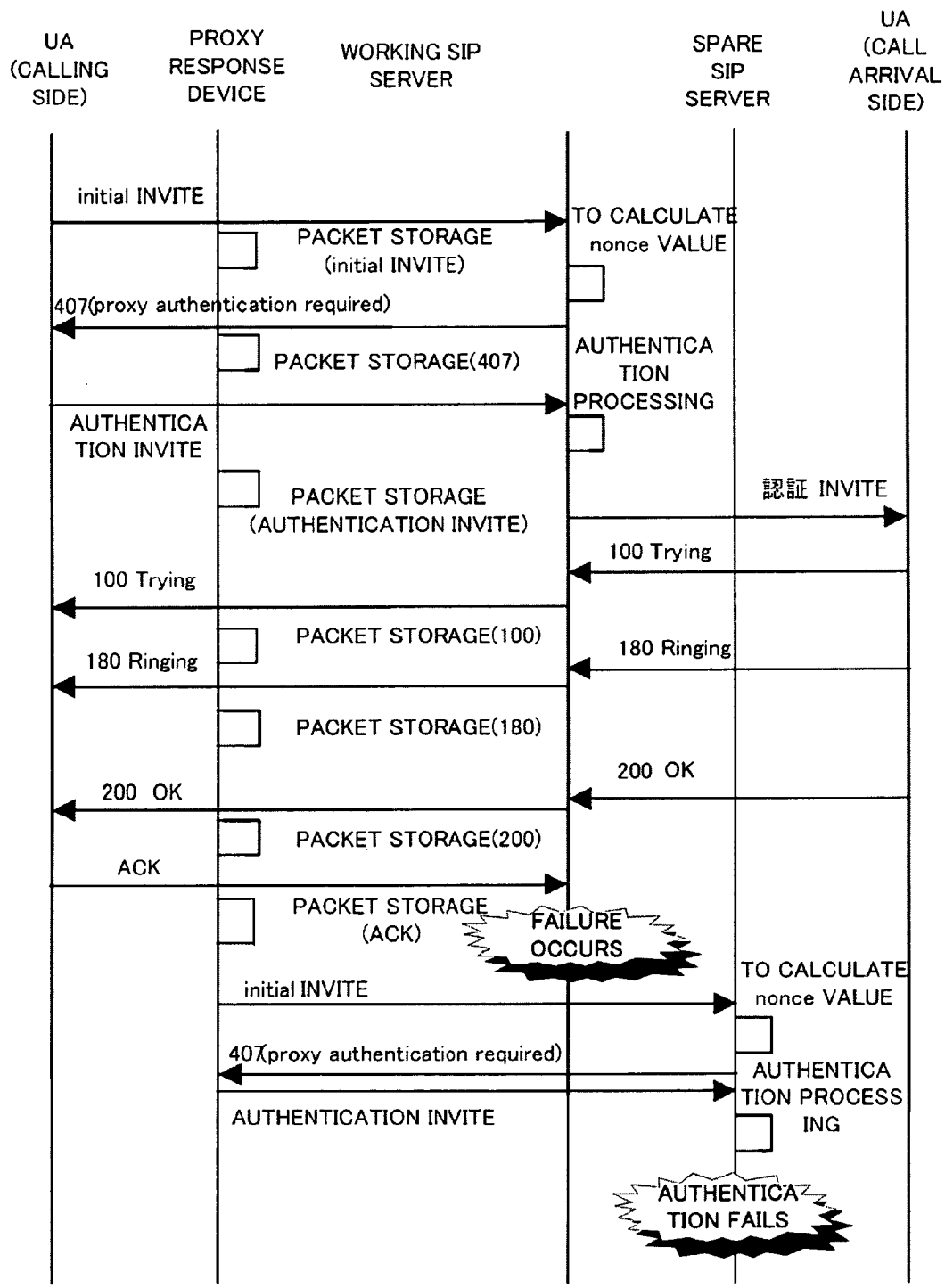
FIG. 21 is a sequence diagram showing an example where a state of a working SIP server cannot be reproduced on a spare SIP server when the related art is applied to an SIP network.

FIG. 10 is a sequence diagram showing operation of the entire system including the proxy server according to the second exemplary embodiment of the present invention and FIG. 11 is a flow chart of the same. As illustrated in FIG. 10 and FIG. 11, in a case where the working SIP server 30 develops a fault when the proxy server 10 receives an authentication INVITE request, similarly to the proxy server 10 according to the first exemplary embodiment of the present invention, after changing a standard transfer destination to the spare SIP server 40 (Step S1101 and Step S1102), generate a re-transmission request (Step S1103) and transmit the same to the user agent 20 (Step S1104). As a result, as defined by the SIP protocol codes, the user agent 20 determines that use will be again allowed after a lapse of Retry-After to issue another initial INVITE request after a lapse of the time period in question (Step S1105).

While the foregoing description has been made with respect to an INVITE request, operation of the proxy server 10 will be the same also with respect to a REGISTER request, so that the user agent 20 side is enabled to transmit an initial REGISTER request again.

Effects of the Second Exemplary Embodiment

Thus, in addition to the effect attained by the first exemplary embodiment, the present exemplary embodiment has an effect that the user agent 20 side is allowed to automatically regenerate a call flow encountering a failure of the working SIP server 30 as a normal new call flow.

This is because when the proxy server 10 detects a failure occurring on the working SIP server 30 after transmitting an authentication INVITE request of the user agent 20, the re-transmission request generation function 16 uses the authentication INVITE request received from the user agent 20 to generate an SIP response with the Retry-After header inserted and transmit the same to the user agent 20. This enables, after the time-out (ordinarily 32 seconds) recited in the SIP protocol codes, the user agent 20 to determine that a caller is in the interrupted state and not to try to manually make a call again after a lapse of an arbitrary time but to automatically transmit an initial INVITE request again to the proxy server 10 after a lapse of the Retry-After header value according to the processing of a common SIP response.

Although the present invention has been described with respect to the preferred exemplary embodiments in the foregoing, the present invention is not necessarily limited to the above-described exemplary embodiments and can be implemented as various modifications within a range of its technical idea.

INCORPORATION BY REFERENCE

This application claims priority based on Japanese Patent Application No. 2006-286189 filed on Oct. 20, 2006 and incorporates all the disclosure of the same.

INDUSTRIAL APPLICABILITY

The proxy server of the present invention is applicable to an SIP network having a plurality of user terminals and a plurality of SIP servers.

What is claimed is:

1. A proxy server comprising:
a processor; and
a memory;
wherein said processor executes, at least in part by using the memory,
an SIP proxy server function of intervening an SIP message transmitted and received between a user terminal, and a working SIP (Session Initiation Protocol) server and a spare SIP server;
a message kind determination function of determining a kind of received message;
a transfer destination failure detection function of detecting and notifying a failure occurring on said working SIP server;
a call failure encounter determination function of determining, based on a notification from said transfer destination failure detection function, whether a message received by said proxy server function belongs to a call flow encountering a failure of said working SIP server or not; and
a destination setting function of setting, based on a notification from said transfer destination failure detection function and according to a failure occurrence situation of said working SIP server and a kind of message received by said proxy server function, a transfer destination of the message,
wherein said call failure encounter determination function comprises a function of using a call identifier list which holds a call identifier stored in said SIP message externally received and is once erased all at the detection of failure occurrence on said working SIP server to determine that said message holding a call identifier not recited in the call identifier list encounters a failure of said working SIP server.

2. A proxy server comprising:
a processor; and
a memory;
wherein said processor executes, at least in part by using the memory,
a proxy server function of intervening an SIP message transmitted and received between a user terminal, and a working SIP server and a spare SIP server;
a message kind determination function of determining a kind of received message;
a transfer destination failure detection function of detecting and notifying a failure occurring on said working SIP server;
a call failure encounter determination function of determining, based on a notification from said transfer destination failure detection function, whether a message received by said proxy server function belongs to a call flow encountering a failure of said working SIP server or not;

a destination setting function of setting, based on a notification from said transfer destination failure detection function and according to a failure occurrence situation of said working SIP server and a kind of message received by said proxy server function, a transfer destination of the message; and a re-transmission request generating function of generating a re-transmission request to be transferred to said user terminal in order to urge said user terminal to re-transfer an initial INVITE request, wherein said call failure encounter determination function comprises a function of using a call identifier list which holds a call identifier stored in said SIP message externally received and is once erased all at the detection of failure occurrence on said working SIP server to determine that said message holding a call identifier not recited in the call identifier list encounters a failure of said working SIP server.

3. The proxy server according to claim 1, wherein said destination setting function comprises a function of holding, as information, a standard transfer destination which is updated by a notification of failure occurrence on said working SIP server notified by said transfer destination failure detection function and to which a message is to be transferred unless otherwise designated.

4. The proxy server according to claim 1, wherein said transfer destination failure detection function comprises a function of monitoring a REGISTER request and an SIP response transmitted and received between said working SIP server and said user terminal and when failing to detect an SIP response from said working SIP server, determining that said working SIP server develops a fault.

5. The proxy server according to claim 1, wherein said destination determination function comprises a function of extracting an address recited next to said working SIP server from information related to a transfer path of a message which is stored in said message and considering the address as a subsequent transfer destination in order to directly transfer the message to the address.

6. The proxy server according to claim 1, wherein said destination determination function comprises a function of cooperating with an external system while ignoring information related to a transfer path which is stored in said message to execute address solution of a destination based on destination information of said message.

7. The proxy server according to claim 2, wherein said re-transmission request generation function comprises a function of generating an SIP response which induces said user terminal to transmit a message again after a lapse of a predetermined time period according to processing to be executed at the time of ordinary SIP response reception.

8. A communication system including working and spare SIP servers which transmit and receive an SIP message to/from a user terminal, and a proxy server which intervenes transmission/reception of said SIP message, wherein said proxy server comprising:

a processor; and
a memory;
wherein said processor executes, at least in part by using the memory,
an SIP proxy server function of intervening an SIP message transmitted and received between the user terminal, and the working SIP server and the spare SIP server;

a message kind determination function of determining a kind of received message;

a transfer destination failure detection function of detecting and notifying a failure occurring on said working SIP server;

a call failure encounter determination function of determining, based on a notification from said transfer destination failure detection function, whether a message received by said proxy server function belongs to a call flow encountering a failure of said working SIP server or not; and a destination setting function of setting, based on a notification from said transfer destination failure detection function and according to a failure occurrence situation of said working SIP server and a kind of message received by said proxy server function, a transfer destination of the message, wherein said call failure encounter determination function of said proxy server comprises a function of using a call identifier list which holds a call identifier stored in said SIP message externally received and is once erased all at the detection of failure occurrence on said working SIP server to determine that said message holding a call identifier not recited in the call identifier list encounters a failure of said working SIP server.

9. A communication system including working and spare SIP servers which transmit and receive an SIP message to/from a user terminal, and a proxy server which intervenes transmission/reception of said SIP message, wherein said proxy server comprising:

a processor; and
a memory;
wherein said processor executes, at least in part by using the memory,
a proxy server function of intervening an SIP message transmitted and received between the user terminal, and the working SIP server and the spare SIP server;

a message kind determination function of determining a kind of received message;

a transfer destination failure detection function of detecting and notifying a failure occurring on said working SIP server;

a call failure encounter determination function of determining, based on a notification from said transfer destination failure detection function, whether a message received by said proxy server function belongs to a call flow encountering a failure of said working SIP server or not;

a destination setting function of setting, based on a notification from said transfer destination failure detection function and according to a failure occurrence situation of said working SIP server and a kind of message received by said proxy server function, a transfer destination of the message; and a re-transmission request generating function of generating a re-transmission request to be transferred to said user terminal in order to urge said user terminal to re-transfer an initial INVITE request, wherein said call failure encounter determination function of said proxy server comprises a function of using a call identifier list which holds a call identifier stored in said SIP message externally received and is once erased all at the detection of failure occurrence on said working SIP server to determine that said message holding a call identifier not recited in the call identifier list encounters a failure of said working SIP server.

10. The communication system according to claim 8, wherein said destination setting function of said proxy server comprises a function of holding, as information, a standard transfer destination which is updated by a notification of failure occurrence on said working SIP server notified by said transfer destination failure detection function and to which a message is to be transferred unless otherwise designated.

11. The communication system according to claim 8, wherein said transfer destination failure detection function of said proxy server comprises a function of monitoring a REGISTER request and an SIP response transmitted and received between said working SIP server and said user terminal and when failing to detect an SIP response from said working SIP server, determining that said working SIP server develops a fault.

12. The communication system according to claim 8, wherein said destination determination function of said proxy server comprises a function of extracting an address recited next to said working SIP server from information related to a transfer path of a message which is stored in said message and considering the address as a subsequent transfer destination in order to directly transfer the message to the address.

13. The communication system according to claim 8, wherein said destination determination function of said proxy server comprises a function of cooperating with an external system while ignoring information related to a transfer path which is stored in said message to execute address solution of a destination based on destination information of said message.

14. The communication system according to claim 9, wherein said re-transmission request generation function of said proxy server comprises a function of generating an SIP response which induces said user terminal to transmit a message again after a lapse of a predetermined time period according to processing to be executed at the time of ordinary SIP response reception.

15. A communication method at a proxy server which, for working and spare SIP servers that transmit and receive an SIP message to/from an external user terminal, intervenes transmission/reception of said SIP message, comprising:
an intervening step of intervening an SIP message transmitted and received between the user terminal, and the working SIP server and the spare SIP server;
a message kind determination step of determining a kind of message received at said intervening step;
a transfer destination failure detection step of detecting and notifying a failure occurring on said working SIP server;
a call failure encounter determination step of receiving a notification from said transfer destination failure detection step to determine whether a message received at said intervening step belongs to a call flow encountering a failure of said working SIP server or not; and
a destination setting step of receiving a notification from said transfer destination failure detection step to set a transfer destination of a message according to a failure occurrence situation of said working SIP server and a kind of message received at said intervening step,
wherein said call failure encounter determination step includes a step of using a call identifier list which holds a call identifier stored in said SIP message externally received and is once erased all at the detection of failure occurrence on said working SIP server to determine that said message holding a call identifier not recited in the call identifier list encounters a failure of said working SIP server.

16. A communication method at a proxy server which, for working and spare SIP servers that transmit and receive an SIP message to/from an external user terminal, intervenes transmission/reception of said SIP message, comprising:
an intervening step of intervening an SIP message transmitted and received between the user terminal, and the working SIP server and the spare SIP server;
a message kind determination function of determining a kind of message received at said intervening step;
a transfer destination failure detection step of detecting and notifying a failure occurring on said working SIP server;
a call failure encounter determination step of receiving a notification from said transfer destination failure detection step to determine whether a message received at said intervening step belongs to a call flow encountering a failure of said working SIP server or not;
a destination setting step of receiving a notification from said transfer destination failure detection step to set a transfer destination of the message according to a failure occurrence situation of said working SIP server and a kind of message received at said intervening step; and
a re-transmission request generating step of generating a re-transmission request to be transferred to said user terminal in order to urge said user terminal to re-transfer an initial INVITE request,
wherein said call failure encounter determination step includes a step of using a call identifier list which holds a call identifier stored in said SIP message externally received and is once erased all at the detection of failure occurrence on said working SIP server to determine that said message holding a call identifier not recited in the call identifier list encounters a failure of said working SIP server.

17. The communication method according to claim 15, wherein said destination setting step includes a step of holding, as information, a standard transfer destination which is updated by a notification of failure occurrence on said working SIP server notified by said transfer destination failure detection step and to which a message is to be transferred unless otherwise designated.

18. The communication method according to claim 15, wherein said transfer destination failure detection step includes a step of monitoring a REGISTER request and an SIP response transmitted and received between said working SIP server and said user terminal and when failing to detect an SIP response from said working SIP server, determining that said working SIP server develops a fault.

19. The communication method according to claim 15, wherein said destination determination step includes a step of extracting an address recited next to said working SIP server from information related to a transfer path of a message which is stored in said message and considering the address as a subsequent transfer destination in order to directly transfer the message to the address.

20. The communication method according to claim 15, wherein said destination determination step includes a step of cooperating with an external system while ignoring information related to a transfer path which is stored in said message to execute address solution of a destination based on destination information of said message.

21. The communication method according to claim 16, wherein said re-transmission request generation step includes a step of generating an SIP response which induces said user terminal to transmit a message again after a lapse of a predetermined time period according to processing to be executed at the time of ordinary SIP response reception.

22. A non-transitory computer readable medium storing a program executed on a proxy server which intervenes transmission/reception of a message, with respect to working and spare communication control devices which transmit and receive said message to/from an external user terminal, comprising:
- an intervening processing of intervening an SIP message transmitted and received between the user terminal, and the working SIP server and the spare SIP server;
- a message kind determination processing of determining a kind of message received at said intervening processing;
- a transfer destination failure detection processing of detecting and notifying a failure occurring on said working SIP server;
- a call failure encounter determination processing of receiving a notification from said transfer destination failure detection processing to determine whether a message received at said intervening processing belongs to a call flow encountering a failure of said working SIP server or not; and
- a destination setting processing of receiving a notification from said transfer destination failure detection processing to set a transfer destination of a message according to a failure occurrence situation of said working SIP server and a kind of message received at said intervening processing,
- wherein said call failure encounter determination processing includes a processing of using a call identifier list which holds a call identifier stored in said SIP message externally received and is once erased all at the detection of failure occurrence on said working SIP server to determine that said message holding a call identifier not recited in the call identifier list encounters a failure of said working SIP server.

23. A non-transitory computer readable medium storing a program executed on a proxy server which intervenes transmission/reception of a message, with respect to working and spare communication control devices which transmit and receive said message to/from an external user terminal, comprising:
- an intervening processing of intervening an SIP message transmitted and received between the user terminal, and the working SIP server and the spare SIP server;
- a message kind determination processing of determining a kind of message received at said intervening processing;
- a transfer destination failure detection processing of detecting and notifying a failure occurring on said working SIP server;
- a call failure encounter determination processing of receiving a notification from said transfer destination failure detection step to determine whether a message received at said intervening processing belongs to a call flow encountering a failure of said working SIP server or not;
- a destination setting processing of receiving a notification from said transfer destination failure detection processing to set a transfer destination of a message according to a failure occurrence situation of said working SIP server and a kind of message received by said intervening processing; and
- a re-transmission request generating processing of generating a re-transmission request to be transferred to said user terminal in order to urge said user terminal to re-transfer an initial INVITE request,
- wherein said call failure encounter determination processing includes a processing of using a call identifier list which holds a call identifier stored in said SIP message externally received and is once erased all at the detection of failure occurrence on said working SIP server to determine that said message holding a call identifier not recited in the call identifier list encounters a failure of said working SIP server.

24. The non-transitory computer readable medium storing the program according to claim 22, wherein said destination setting processing includes a processing of holding, as information, a standard transfer destination which is updated by a notification of failure occurrence on said working SIP server notified by said transfer destination failure detection processing and to which a message is to be transferred unless otherwise designated.

25. The non-transitory computer readable medium storing the program according to claim 22, wherein said transfer destination failure detection processing includes a processing of monitoring a REGISTER request and an SIP response transmitted and received between said working SIP server and said user terminal and when failing to detect an SIP response from said working SIP server, determining that said working SIP server develops a fault.

26. The non-transitory computer readable medium storing the program according to claim 22, wherein said destination determination processing includes a processing of extracting an address recited next to said working SIP server from information related to a transfer path of a message which is stored in said message and considering the address as a subsequent transfer destination in order to directly transfer the message to the address.

27. The non-transitory computer readable medium storing the program according to claim 22, wherein said destination determination processing includes a processing of cooperating with an external system while ignoring information related to a transfer path which is stored in said message to execute address solution of a destination based on destination information of said message.

28. The non-transitory computer readable medium storing the program according to claim 23, wherein said re-transmission request generation processing includes a processing of generating an SIP response which induces said user terminal to transmit a message again after a lapse of a predetermined time period according to processing to be executed at the time of ordinary SIP response reception.

* * * * *